(12) United States Patent
Jacob

(10) Patent No.: US 7,194,598 B2
(45) Date of Patent: Mar. 20, 2007

(54) SYSTEM AND METHOD USING EMBEDDED MICROPROCESSOR AS A NODE IN AN ADAPTABLE COMPUTING MACHINE

(75) Inventor: Rojit Jacob, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 278 days.

(21) Appl. No.: 10/765,556

(22) Filed: Jan. 26, 2004

(65) Prior Publication Data

US 2005/0166033 A1    Jul. 28, 2005

(51) Int. Cl.
*G06F 15/16* (2006.01)
(52) U.S. Cl. ...................................................... 712/10
(58) Field of Classification Search ................. 712/31, 712/34, 10; 709/251
See application file for complete search history.

(56) References Cited

U.S. PATENT DOCUMENTS

| | | | |
|---|---|---|---|
| 6,134,605 A * | 10/2000 | Hudson et al. ............... | 710/13 |
| 6,467,009 B1 * | 10/2002 | Winegarden et al. ........ | 710/305 |
| 6,604,189 B1 * | 8/2003 | Zemlyak et al. .............. | 712/31 |
| 6,647,429 B1 * | 11/2003 | Semal ........................... | 709/251 |
| 6,760,833 B1 * | 7/2004 | Dowling ....................... | 712/34 |

\* cited by examiner

*Primary Examiner*—Eric Coleman
(74) *Attorney, Agent, or Firm*—Patterson & Sheridan, L.L.P.

(57) ABSTRACT

The present invention provides an adaptive computing engine (ACE) that includes processing nodes having different capabilities such as arithmetic nodes, bit-manipulation nodes, finite state machine nodes, input/output nodes and a programmable scalar node (PSN). In accordance with one embodiment of the present invention, a common architecture is adaptable to function in either a kernel node, or k-node, or as general purpose RISC node. The k-node acts as a system controller responsible for adapting other nodes to perform selected functions. As a RISC node, the PSN is configured to perform computationally intensive applications such as signal processing. The present invention further provides an interconnection scheme so that a plurality of ACE devices operates under the control of a single k-node.

48 Claims, 15 Drawing Sheets

| Data Memory Map | | Instruction Memory Map | |
|---|---|---|---|
| Node Memory | -- 0x0000 0000 | Reserved | -- 0x000 0000<br>-- 0x0000 0008 |
| | | Node Memory | |
| Reserved | -- 0x0000 4000 | Reserved | -- 0x000 4000 |
| ROM | -- 0x0000 8000 | ROM | -- 0x000 8000 |
| Reserved | -- 0x0000 A000 | Reserved | -- 0x000 A000 |
| Secure Ram | -- 0x0000 C000 | External Instruction Memory Overlay | -- 0x200 0000<br>: 0x0000 0000 |
| Reserved | -- 0x0000 CAC0 | | -- 0x3ff ffff<br>: 0x01ff ffff |
| Node Registers | -- 0x0001 8000 | | |
| Reserved | -- 0x0001 9000 | Note: External Instruction Memory Overlay and External Data Memory have the same memory locations within external memory | |
| Input/Output Buffer Access | -- 0x0040 0000 | | |
| Forward/Backward Acknowledgement | -- 0x0060 0000 | | |
| Own Node Wrapper Access | -- 0x0070 0000 | | |
| Reserved | -- 0x0070 4000 | | |
| External Instruction Memory Overlay | -- 0x0200 0000 : 0x0000 0000 (K-Node addr : XMC addr) | | |
| Reserved | -- 0x0400 0000 : 0x0200 0000 (K-Node addr : XMC addr)<br>-- 0x1000 0000 : 0x0000 0000 (K-Node addr : XMC addr) | | |
| External Data Memory | | | |
| Reserved | -- 0x2000 0000 : 0x1000 0000 (K-Node addr : XMC addr)<br>-- 0x4000 0000 : 0x0000 0000 (K-Node addr : XMC addr) | | |
| Chip 0 External Data Memory | -- 0x5000 0000 : 0x0000 0000 (K-Node addr : XMC addr) | | |
| Chip 1 External Data Memory | -- 0x6000 0000 : 0x0000 0000 (K-Node addr : XMC addr) | | |
| Chip 2 External Data Memory | -- 0x7000 0000 : 0x0000 0000 (K-Node addr : XMC addr) | | |
| Chip 3 External Data Memory | -- 0x8000 0000 : 0x1000 0000 (K-Node addr : XMC addr) | | |
| ACM Chip and Node Access (Details in Figure 2) | | | |
| Reserved | -- 0x8340 0000<br>-- 0xffff ffff | | |

Figure 5A

SYSTEM AND METHOD USING EMBEDDED MICROPROCESSOR AS A NODE IN AN ADAPTABLE COMPUTING MACHINE

CROSS-REFERENCES TO RELATED APPLICATIONS

This application claims priority to U.S. NonProvisional Ser. No. 10/673,678 filed Sep. 29, 2003 which claims priority to U.S. Provisional Ser. No. 60/415,320 filed Sep. 30, 2002, both of which are incorporated by reference herein.

This application is also related to commonly assigned patent application entitled "Adaptive Integrated Circuitry with Heterogeneous and Reconfigurable Matrices of Diverse and Adaptive Computational Units Having Fixed, Application Specific Computational Elements" by Gene Hogenauer et al., application Ser. No. 09/815,122, filed Mar. 22, 2001.

BACKGROUND OF THE INVENTION

Embodiments of the present invention relate to digital processing architectures. More particularly, embodiments of the present invention relate to the operation of a plurality of interconnected adaptive computing engine devices.

Many different types of integrated circuit technology are employed to achieve optimal cost versus performance characteristics in electronic devices. For example, application specific integrated circuits (ASICs) and field programmable gate array (FPGAs) are two types of integrated circuit technology that are widely employed to implement a variety of electronic finctions.

ASICs and FPGAs are preferred for many integrated circuit applications because of the ability to reduce the design cycle and quickly produce new or different functions. ASICs may be customized by merely generating masks for one or more metal interconnect layers, which reduces the manufacturing process by several weeks. FPGAs may be customized in the field by programming fusible links to connect logic elements to achieve the desired functions.

While widely used, ASICs and FPGAs suffer from well-known drawbacks and limitations. For example, both technologies generally are slower, require larger die and are less power efficient than dedicated or custom integrated circuits. Notwithstanding the drawbacks and limitations, ASICs and FPGAs are often used in portable or battery-powered digital devices because the product life cycle is usually very short. Thus, it is impracticable to design custom or dedicated integrated circuits.

Many digital devices, such as cellular telephones, personal digital assistants (PDAs), notebook computers and other battery-powered devices, require several low power integrated circuits so the device can perform a variety of functions. For example, there is a need for a cellular telephone that can perform communication functions, high-speed data transmission, location awareness, true handwriting, speech and visual recognition, as well as other functions such as calendaring, word processing, accessing the Internet and responding to electronic mail (e-mail), digital photography. It is also desirable that other functions that have historically been performed by PDAs or notebook computers rather than a cellular telephone be provided in a small portable power efficient package. Clearly, to achieve all of these functions in a small package, there is a great need to minimize the number of integrated circuits required to perform these functions in order to reduce the size and weight of the digital devices and to improve power efficiency.

It is therefore desirable to provide an integrated circuit that can be adapted to perform one of several different functions. There is also a great need for a mobile communication device, such as a cellular telephone, that interfaces with multiple communication worldwide standards so that users can roam throughout the world and also provides the features to call, page, email, and connect to the Internet.

SUMMARY OF EMBODIMENTS OF THE INVENTION

In accordance with one embodiment of the present invention, an adaptive computing engine (ACE) comprises a microprocessor based node that may be adapted to function either as a kernel node, or k-node, or as general purpose RISC node, or programmable scalar node (PSN).

Embodiments of the present imvention also further provide a method for configuring the PSN to operate as either a k-node or as a RISC node.

The adaptable engine is generally operated as part of a multi-functional device such as a cellular phone, a camera, global positioning system, fax machine, or video conferencing system by way of example. The engine enables a user to access a plurality of functions such as communication, high-speed data transmission, location awareness, true handwriting, speech and visual recognition, calendaring, word processing, accessing the Internet and responding to electronic mail (e-mail), digital photography and many other functions in a single device.

In accordance with embodiments of the present invention, the engine can change from one function to another "on-the-fly" by downloading executable computer code that includes hardware descriptions and instructions for performing a selected function. The computer code is downloadable from the Internet, other wireless or wired communication network or storage device so that, ideally, computer code can be obtained at any time, and anywhere in the world. In this manner, the user need not carry several devices; each dedicated to a desired function but rather may carry a single multi-function device.

The ACE's architecture has inherent system adaptability in which selected algorithms are directly mapped to dynamic hardware resources, resulting in the efficient use of hardware in terms of cost and size, with corresponding high performance and low power consumption. Thus, there is no need to provide an integrated circuit that is dedicated to a particular function such as cellular communication and another integrated circuit that is dedicated to digital photography as the ACE may be adapted to perform either function.

The ACE includes a plurality of processing nodes such as arithmetic nodes, bit-manipulation nodes, finite state machine nodes, input/output nodes and a programmable scalar node (PSN). The PSN, in accordance with embodiments of the present invention, has an embedded microprocessor circuit that may be adapted to function in either as a controller node, which is also referred to as a kernel node or a k-node, or as general purpose RISC node.

The k-node executes operating system instructions and manages operation of the ACE. The k-node is used to adapt other nodes to perform a function in much the same way that a subroutine may be called in a software program to perform a particular function. Further, the k-node, manages data flow between other nodes.

When operating as a RISC node, the PSN may be used for intensive applications requiring large code space. Thus, the PSN may be adapted to perform digital signal processing (DSP) functions at one point in time and then adapted to process digital photographic images. As used herein, RISC refers to a reduced instruction set computer.

As will be appreciated, the selection of PSN node type, the number of nodes, interconnection of nodes and other characteristics, determine the ultimate processing ability of the ACE, or other processing system using, the nodes. Advantageously, the ACE is adapted in real time.

Depending on the application, the adaptable engine may require more nodes than available on a single semiconductor device. Accordingly, in one embodiment of the present invention, an adaptive computing engine (ACE) is configured using two or more discrete semiconductor devices to increase the number of nodes available to perform the desired functions.

Embodiments of the present invention also further provide a system and method for enabling high-speed communication between the discrete semiconductor devices comprising the adaptable engine and for communicating with other devices or systems.

BRIEF DESCRIPTION OF THE DRAWINGS

FIGS. 5A and 5B illustrate representative partial memory maps for a k-node and a PSN, respectively, in accordance with an embodiment of the present invention.

DETAILED DESCRIPTION OF EMBODIMENTS OF THE INVENTION

In the description herein for embodiments of the present invention, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

A preferred embodiment of the invention provides an adaptive computing engine (ACE) based on digital integrated circuit technology (IC). The ACE's architecture has inherent system adaptability in which selected algorithms are directly mapped to dynamic hardware resources, resulting in the efficient use of hardware in terms of cost and size, with corresponding high performance and low power consumption. Central to the adaptability of the ACE is a programmable node that can function as either a controller node, or k-node, that controls the operation of the ACE under control of an operating system or as a programmable scalar node (PSN) computing node. In one embodiment, the k-node and the PSN are broadly similar in architecture in that both have an embedded microprocessor logic block, but the two nodes are adapted to perform very different system functions.

Figure 1:
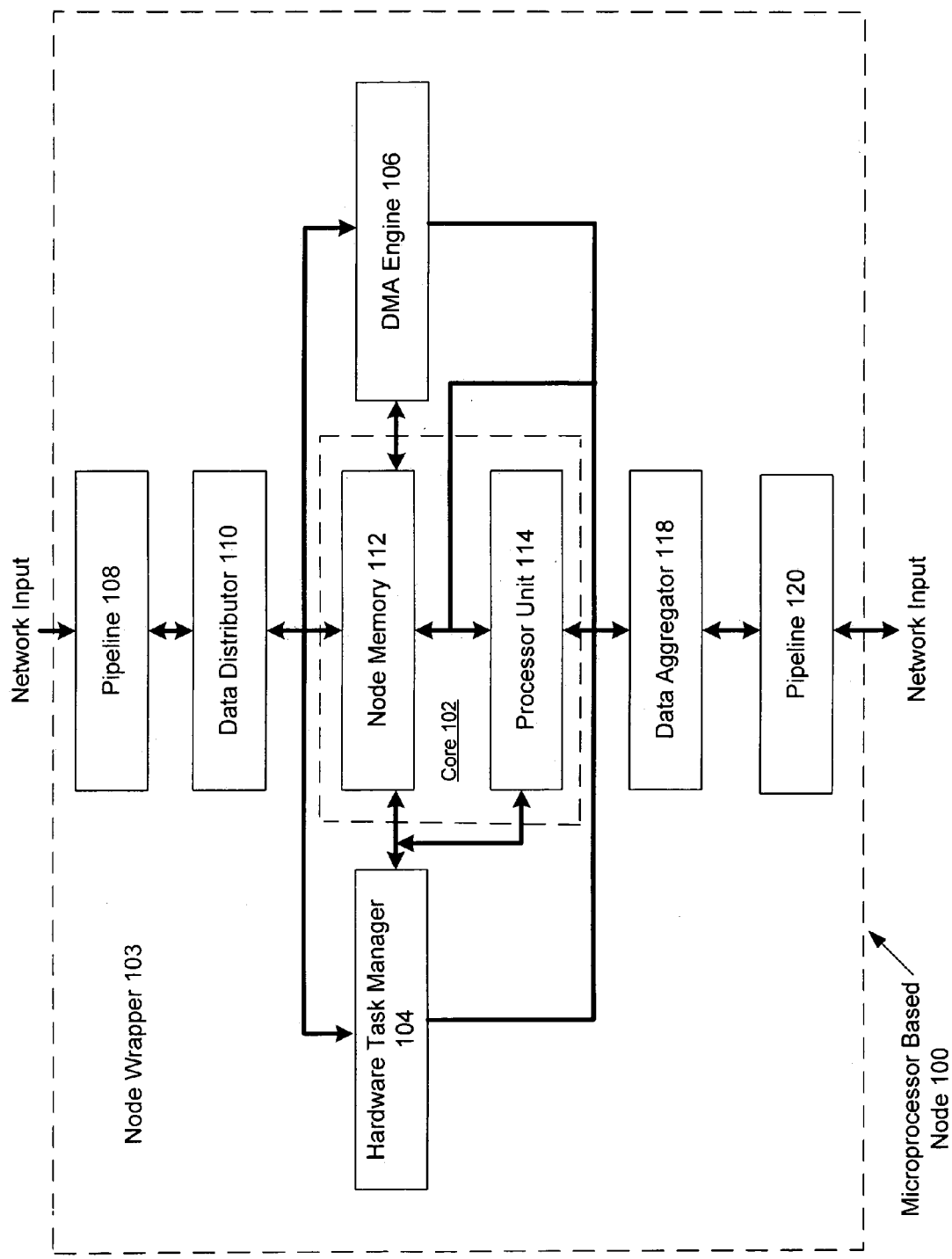
FIG. 1 is a block diagram of an exemplary programmable scalar node, or PSN, and node wrapper system interface in accordance with an embodiment of the present invention.

Referring now to the drawings more particularly by reference numbers, a block diagram of the nodal architecture of an exemplary microprocessor based node is shown in FIG. 1. Microprocessor based node 100 comprises an execution unit, or adaptive core 102, surrounded by a node wrapper 103. Adaptive core 102 includes memory and computational elements. More specifically, adaptive core 102 may comprise node memory 112 and processor unit 114. Sufficient node memory is provided for both instructions and data necessary to implement various algorithms. Processor unit 114 is preferably a general-purpose synthesizable RISC microprocessor.

Node wrapper 103 comprises data and configuration management elements. Data management elements include a hardware task manager 104, which configures adaptive core 102 to perform a desired function or implement a particular algorithm, and DMA Engine 106, which manages memory access and allocation tasks. Node wrapper 103 provides the resources necessary to support communications with other nodes. Each node, with the exception of the k-node, presents an identical interface to its node wrapper 103. When active signals passing between the k-node and its node wrapper are unused in other nodes, the signal may be tied to a constant voltage.

Microprocessor based node 100 further comprises network interface elements. Pipeline 108 receives data, configuration information and instructions from a network input and handles handshaking and timing requirements. In one embodiment, data, configuration information and instructions are combined or commingled in one continuous stream of information. This stream of information is then passed by pipeline 108 to data distributor 110.

Data distributor 110 passes configuration information to hardware task manager 104. Data distributor 110 parses the information stream and directs data and instructions to node memory 112 under control of DMA engine 106. DMA Engine 106 is used for transferring data from local memory to other nodes and memories residing on the MIN. DMA Engine 106 can be controlled by k-node poking into its own Node Wrapper.

DMA engine 106 further monitors the information stream to separate data from instructions. DMA engine 106 directs data and instructions to the necessary location in node memory 112. Once in memory, processor unit 114 executes instructions to perform the desired function using or modifying the data.

When the execution of the algorithm or function is concluded, data, instructions and/or configuration information are passed to data aggregator 118. Data aggregator 118 creates an output data stream to be passed to at least one other node. Pipeline 120 provides the handshake and control interface to the communication network that links the various nodes for data aggregator 118.

To illustrate the operation of microprocessor based node 100, a particular first configuration is set by hardware task manager 104 to perform a particular task or function. The configuration to execute a particular algorithm or function during or after a first period of time is received in a first stream of information either from the Internet or from a memory. Transmission of the first stream is typically, but not always initiate by a user request. Conceptually, the configuration process may be considered as a hardware equivalent of "calling" a subroutine in software to perform the algorithm. The data distributor is responsible for parsing the information stream to pass configuration information to the hardware task manager 104.

The first information stream further includes instructions for execution by processor unit 114 and data, which is to be stored in node memory 112. Data distributor 110 is responsible for placing instructions into memory. Once core 102 is configured as directed by configuration information, processor unit 114 executes the instructions to perform the selected algorithm or function using the data that was received in the stream of information. The node may then be adapted to perform a different selected algorithm or function during a second or subsequent time period or to operate the same algorithm or function on different data. The temporal nature of adaptable microprocessor-based node 100 enables the node to efficiently adapt to the requirements of each algorithm or function. Thus, mobile or battery powered devices more efficiently use available hardware in terms of cost and silicon area, with improved performance and low power consumption compared to ASIC, FPGA or custom designed integrated circuits.

Figure 2:
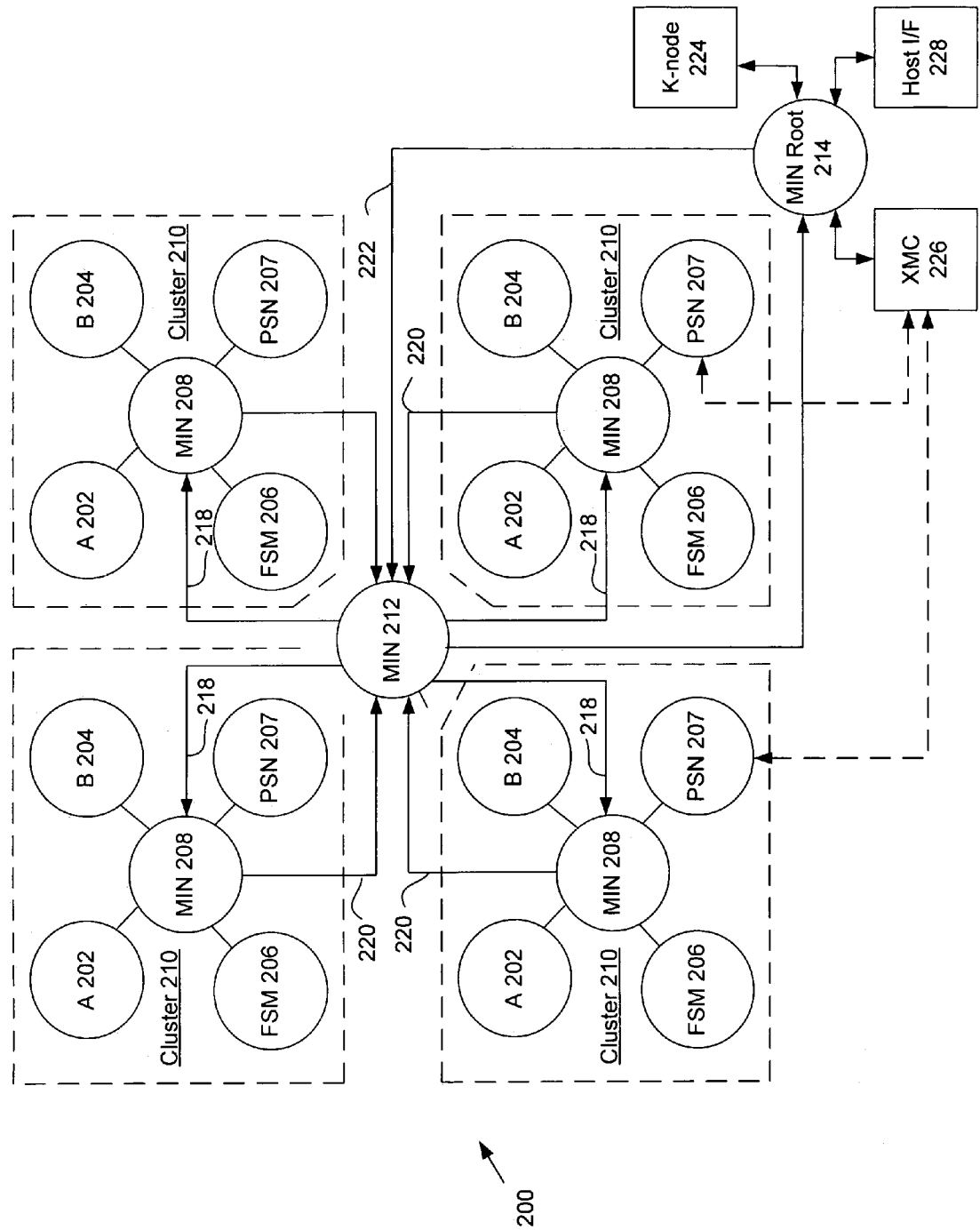
FIG. 2 is a block diagram a representative general architecture of the integrated circuit device having an adaptable computing engine in accordance with an embodiment of the present invention.

FIG. 2 illustrates the architecture of a portion of an adaptive computing engine (ACE) 200 that includes different node types to perform different functions. In one embodiment, ACE 200 includes a plurality of clusters 210 each of which includes an arithmetic node 202, a bit-manipulation node 204 and a finite state machine node 206 in addition to microprocessor-based node 100 (FIG. 1). Each node is coupled to matrix interconnect network (MIN) 208, which in turn couples each cluster 210 to a second level matrix interconnect network 212. MIN 212 couples up to four clusters 210 to a third level MIN 214. The MIN communication structure is preferably a 51-bit wide bus to minimize the delay associated with transferring information or data from one node to another.

ACE 200 further includes a k-node 224 coupled to MIN 214, which is also referred to the root level. An external memory controller 226 and host interface 228 are also connected to MIN 214. The k-node 224 receives instructions and configuration data from an external source such as a system controller (not shown) through host interface 228 upon startup or initiation of operation and then proceeds to adapt the nodes in each cluster 210 in accordance with configuration information. External memory controller 226 is adapted to interface with external memory, which may be DRAM, SRAM, Flash or any other volatile or non-volatile random access memory. In one preferred embodiment, k-node 224 is based on similar in architecture as microprocessor based node 100 in that each includes a similar processor core 114 (FIG. 1). However, the k-node is adapted to execute operating system functions more efficiently. In another embodiment, the k-node is a PSN adapted to function as a k-node. Configuring the PSN is easily accomplished by setting a configuration register. When microprocessor based node 100 is configured as the k-node it executes boot code, operating system code and application code rather than algorithms to implement specific functions or features. Regardless of the embodiment implemented, no more than one k-node is on each integrated circuit having the chip ID of $00_2$. Any other ACE device having a k-node will, upon boot-up, have the k-node configured to function as a PSN.

Although engineering decisions may dictate otherwise, there may be one in each cluster 210 connected to each local branch of the MIN 208. Thus, each PSN has three peer nodes, with which it contends for communication resources. Cluster 210 in most cases resolves the contention of its nodes by means of a round-robin fairness algorithm. However, in the case of a packet-mode Point-to-Point (PTP) communications process, one sending node and one receiving node may be designated to have priority within each cluster. Then a sequence of arbiter circuits (not shown), in the path from the sending node up through the root MIN and back down to the receiving node, are locked for the duration of the packet-mode PTP communication process. The k-node has to authorize locking these arbiter circuits for each PTP communications process.

This matrix configuration may be extended to encompass a hierarchy of an arbitrary number of levels or tiers. Thus, although only four clusters are shown in FIG. 2, it is to be understood that any number of such clusters may be provided on an integrated circuit as the architecture is inherently scaleable.

Each node 202–206 and microprocessor based node programmable scalar node 207 includes a number of computational elements and local memory surrounded by wrapper elements such as described in FIG. 1. Each node may be adapted on the fly to perform a desired function or to execute a specific algorithm.

To illustrate, an arithmetic node 202 can be adapted to implement variable width linear arithmetic functions such as a FIR filter, a Discrete Cosign Transform (DCT), a Fast Fourier Transform (FFT) and the like. A bit manipulation nodes 204 can be adapted to implement different width bit-manipulation functions, such as a linear feedback shift register (LRSR), Walsh code function generator, code generators or a TCP/IP packet discriminator, by way of example. Finite state machine (FSM) nodes 206 can implement any class of FSM. Microprocessor based node can be adapted to function as a programmable scalar node (PSN) 207 that can execute legacy code or code algorithms to implement new functions or features.

Figure 3:
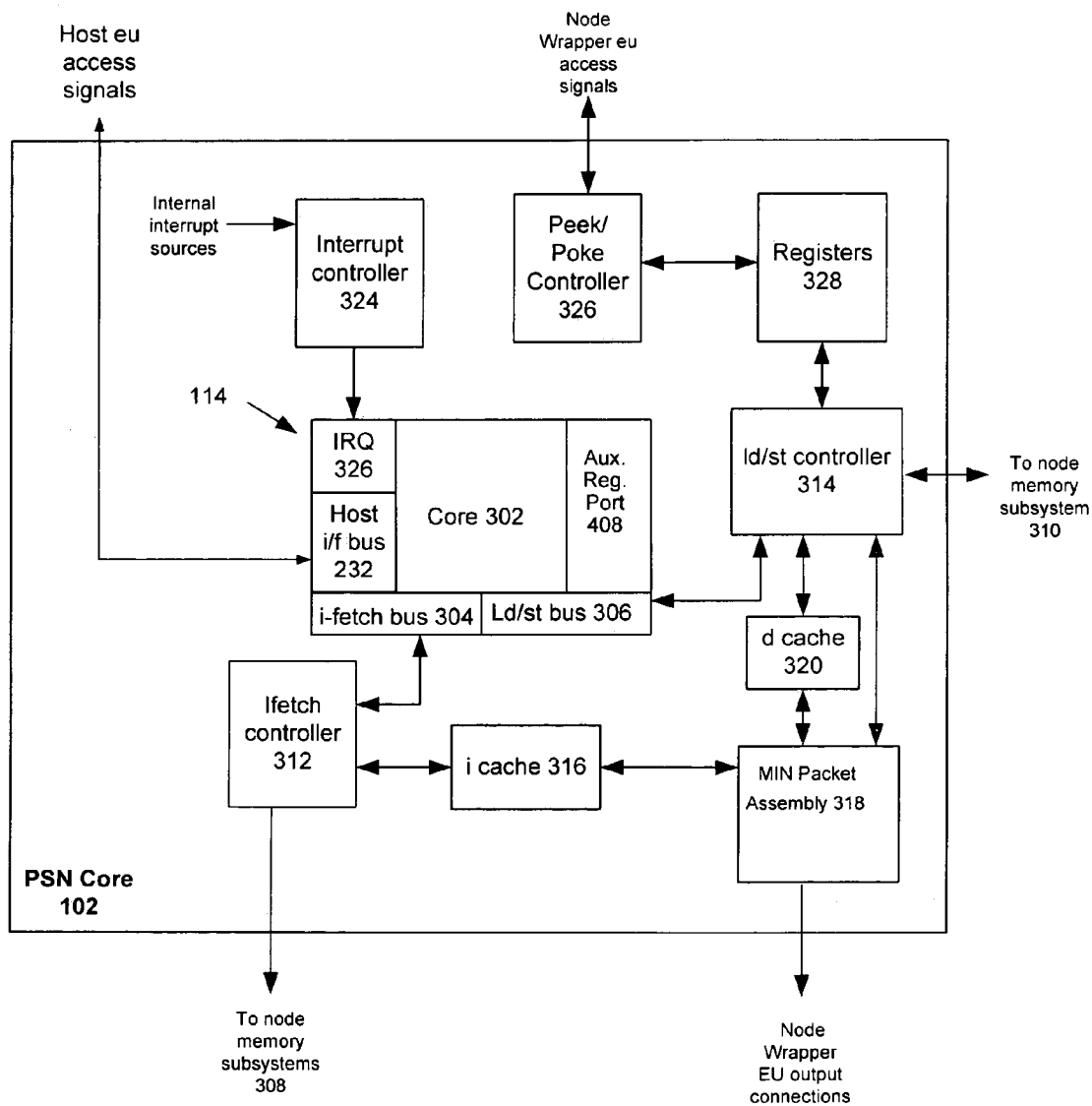
FIG. 3 is a block diagram of an exemplary PSN node in accordance with an embodiment of the present invention.

FIG. 3 shows in greater detail the architectural features of the adaptive core 102 of microprocessor based node 100 when adapted to function as a programmable scalar node (PSN). More specifically, processor unit 114 includes a processor core 302 that is coupled to node memory 112 by an instruction fetch bus 304 and load/store bus 306. Processor core 302 is preferably a 32-bit little-endian RISC processor that provides zero overhead loops, conditional branches and jumps. Processor unit 114 includes 32 general-purpose registers and a 32-bit instruction format, maskable and non-maskable interrupts and a host interface 322, sleep mode to improve power efficiency in-quiescent operating conditions, and clock-gating options. In the preferred embodiment, processor core 302 is commercially available from ARC International.

Memory 112 comprises 16-Kbyte private node memory 112 that includes an instruction memory 308 for storing executable instructions and data memory 310 for storing data and other information. Processor unit 114 accesses instruction memory 308 over the I-fetch bus 304. I-fetch bus 304 can be extended to 26-bit width to provide addressing up to 64 MB of instructions. Processor unit 302 separately and independently accesses data memory 310 over the load/store bus 306. The load/store memory bus size can be extended to 32-bit width to provide addressing up to 4 GB of data. The Load/Store bus provides a delayed load with register scoreboard, buffered store, and address register writeback. Both memories 308 and 310 have independent read and write ports and are controlled by ifetch controller 312 and load/store controller 314, respectively.

Processor unit 114 accesses instruction memory 308 over the I-fetch bus 304. I-fetch bus 304 can be extended to 26-bit width to provide addressing up to 64 MB of instructions. Processor unit 302 separately and independently accesses data memory 310 over the load/store bus 306. The load/store memory bus size can be extended to 32-bit width to provide addressing up to 4 GB of data.

Processor unit 114 is designed with a four-stage pipeline and requires that all the instructions in the pipeline execute at different stages in the process to avoid stalling or flushing of the pipeline. The first stage of the pipeline fetches instructions. The second stage of the pipeline decodes the fetched instruction and fetches any operands. The third stage executes the operation specified by the instruction. The fourth stage writes the results back to core or internal registers or other memory.

When processor core 302 requires an instruction, ifetch controller 312 first looks to see if instructions are pending in an instruction cache 316 which is a high-speed memory that stores only those instructions that processor 302 may need in the immediate future. In one embodiment, instruction cache is a 1-Kbyte direct-mapped cache with a line size of 64 bytes, which equals sixteen instructions. Data width is 32 bits and address width is 26 bits.

Attempts to fetch instruction from memories other than the local node memory will be passed to controller 312. When a cache miss occurs, an entire cache line is fetched from the memory source. The refill of cache line that contained the missing instruction always starts from the beginning of the line. The processor is stalled only until the requested instruction within the cache line has been fetched and the missing instruction passed to the processor. The processor is then restarted while the rest of the cache line refill continues. When processor core 302 requires data, load/store controller 314 looks to see if data is present in data cache 320.

If the cache 316 does not contain the necessary instructions, controller 312 will transfer a group of instructions from external memory to cache 316. Controller 312 then transfers instructions to processor unit 114. Controller 312 initiates instruction transfer by authorizing MIN packet assembler 318 to transfer instructions into cache 316.

MIN packet assembler 318 handles node-to-node communication and handshaking requirements. Node-to-node communication includes packets, memory reads and writes as well as peeks and pokes to specific memory or register locations. When configured as a k-node, processor core 114 can generally peek and poke to all device memory and registers. However, when configured as a PSN, the processor core can only peek and poke into memory or registers within its own node wrapper, its execution unit, and its nodal memory.

Data cache 320 is a high-speed memory that stores data that has a high probability of being used by processor 302. In one preferred embodiment, it is a 1-Kbyte direct-mapped cache with a line size of 64 bytes, which is sixteen doublewords and a writeback policy upon a cache miss. Data width is 32 bits and address width is 32 bits. Prior art predictive algorithms may be employed to determine the criteria for selecting and transferring data from external memory to cache 320. Controller 314 obtains data from outside of core 102 from MIN packet assembler 318, which interfaces with other nodes or circuits.

If memory transactions are targeted for other nodes, either controller 312 or controller 314 passes the memory transaction directly to MIN packet assembly 318. MIN packet assembly 318 assembles packets comprising the memory request to be sent to other memory controllers associated with other nodes sitting on the MIN. MIN packet assembly 318 takes all MIN traffic passed from each controller and packages them into MIN words for the data aggregator 118 in the node wrapper 103. MIN packet assembly 318 includes configuration parameters for each of the input and output buffers. These parameters are obtained from configuration registers in registers 328.

In operation, controllers 312 and 314 determine whether a memory request is a local memory access, an external memory access, or an input or output buffer access, from either ifetch or load/store buses. Controller 314 maps, if necessary, load/store memory access addresses to a base physical memory page on a per task basis. Nodes do not directly communicate with each other but rather use the node wrapper 103 to interface to the matrix interconnect network (MIN) which services all on-chip operating entities.

Microprocessor based node 100 further includes an interrupt controller 324 to handle interrupts from internal sources; peek/poke controller 326 to handle memory access from the node wrapper requesting to look or write at the execution units' registers 328 or registers 408. The peek/poke controller 326 and registers 328 provide the interface between the hardware task manager and processor core 302.

Figure 4:
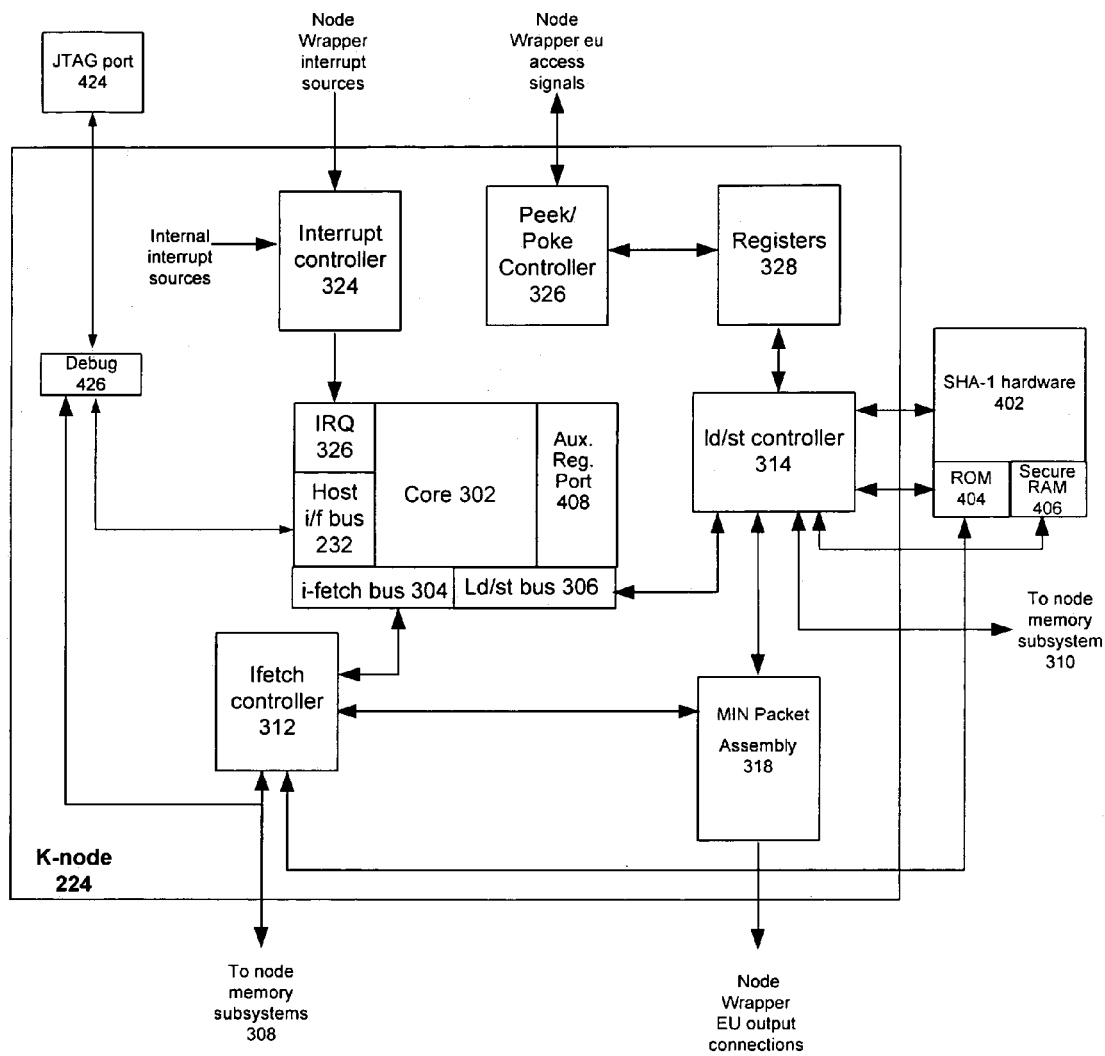
FIG. 4 is a block diagram of an exemplary k-node in accordance with an embodiment of the present invention.

In contrast to the PSN, k-node 224 comprises characteristics not present in a PSN as shown in FIG. 4. Specifically, k-node 224 includes security hardware 402 that supports a secure hash algorithm using a RSA algorithm. A 1024 bit digital signature is stored in an 8-Kbyte ROM 404 that also stores boot code and security code. The k-node also includes 2752 bytes of RAM 406. Because the k-node controls the entire integrated circuit, a JTAG access port 424 provides access to a debug port 426 supports access to the processor core and nodal memory to enable debug in the event the execution of processor core 114 results in an error condition. Upon power on or a reset condition, the k-node boots from its own private 8-Kbyte ROM. A secure hash algorithm cryptoprocessor core, such as the SHA-1 processor, which is a commercially available from Cast, Inc. of Woodcliff Lake, N.J., is controlled through the load/store controller 314.

Although k-node 224 and microprocessor based node 100 share similar architecture, each has very different system functions. Accordingly, the memory maps for the k-node and the PSN differ even though they share certain common features. For example, both maps reserve addresses from 0x0000_0000 through 0x0000_3fff to address their private node SRAM, and addresses from 0x4000_0000 through 0x_7fff_ffff are reserved to address external data memories.

Figure 5B:
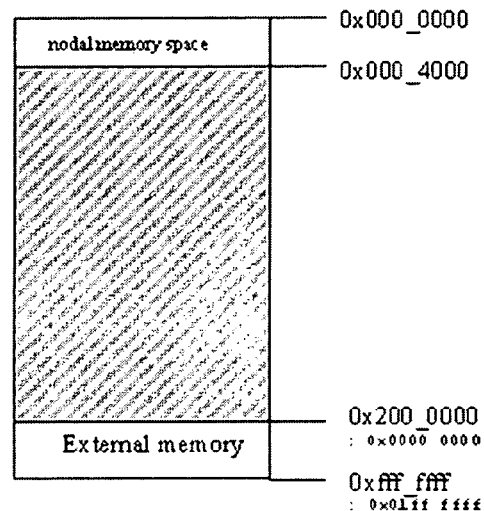

FIGS. 5A and 5B illustrates a representative example of a memory map as seen by a task running on a k-node 224 and a microprocessor based node 100, respectively. Instruction and data access requests are handled separately and independently. Instruction access presents the physical memory address, while data access may be translated and mapped to a physical address that corresponds to a logical address.

The nodal memory (308 and 310) is 16 Kbytes in size. Instruction fetches are done from the nodal memory at locations 0x0 through 0x3fff (FIG. 5A). Instruction fetches from nodal memory are single cycle accesses, except when a one cycle stall occurs due to a collision with a data load from the same memory block, or a one cycle stall occurs due to a node wrapper read caused by a peek to the same memory block. Instructions from nodal memory are not cached in the instruction cache for the k-node.

The reset vector is located in the Boot ROM. The processor boots with address 0x0000 that is mapped to boot ROM address (0x8000). The address 0x0004 is also mapped to address 0x8004. This means that the first instruction in the Boot Rom should be a "Jump" to location 0x8008 (boot code section). This prevents instruction fetches to continue from 0x0008 (nodal memory) automatically after 0x0004 (0x8004, Boot Rom).

The ROM 404 is from 0x8000–0xA000, is 8K bytes in size and has read only access. The boot code and the security code reside in the ROM from 0x8000. The secure RAM including the SHA-1 memory is from 0xC000–0xCABF and 2752 bytes in size.

Address range 0x1_8000–0x1_8fff is reserved for the memory-mapped registers within the K-node. Read and writes to these registers by loading and storing to address range—0x1_8000 through 0x1_8fff.

Load/stores are done from/to the nodal memory at locations 0x0 through 0x3fff. When a load collides with an instruction fetch to the same memory block, the load has priority over the instruction fetch to that same memory block.

All the interrupt vectors other than the reset vector are located in the nodal memory. The instruction fetches from location 0x0000 and 0x0004 are prohibited in the nodal memory. Those addresses are mapped to the Boot Rom (reset vector location).

FIG. 5B illustrates the nodal memory map for microprocessor-based node 100. Specifically, the nodal memory is 16 Kbytes in size. Instruction fetches are done from the nodal memory at locations 0x0 through 0x1fff0x3fff. Instructions from nodal memory are not cached in the instruction cache.

Load/stores are done from/to the nodal memory at locations 0x0 through 0x3fff. When a load collides with an instruction fetch to the same memory block, the load has priority.

Address range 0x1_8000–0x1_8fff is for the memory-mapped registers within the PSN Node. Executable code running on the PSN node performs read and writes operations to the registers in the address range—0x1_8000 through 0x1_8fff.

Figure 6:
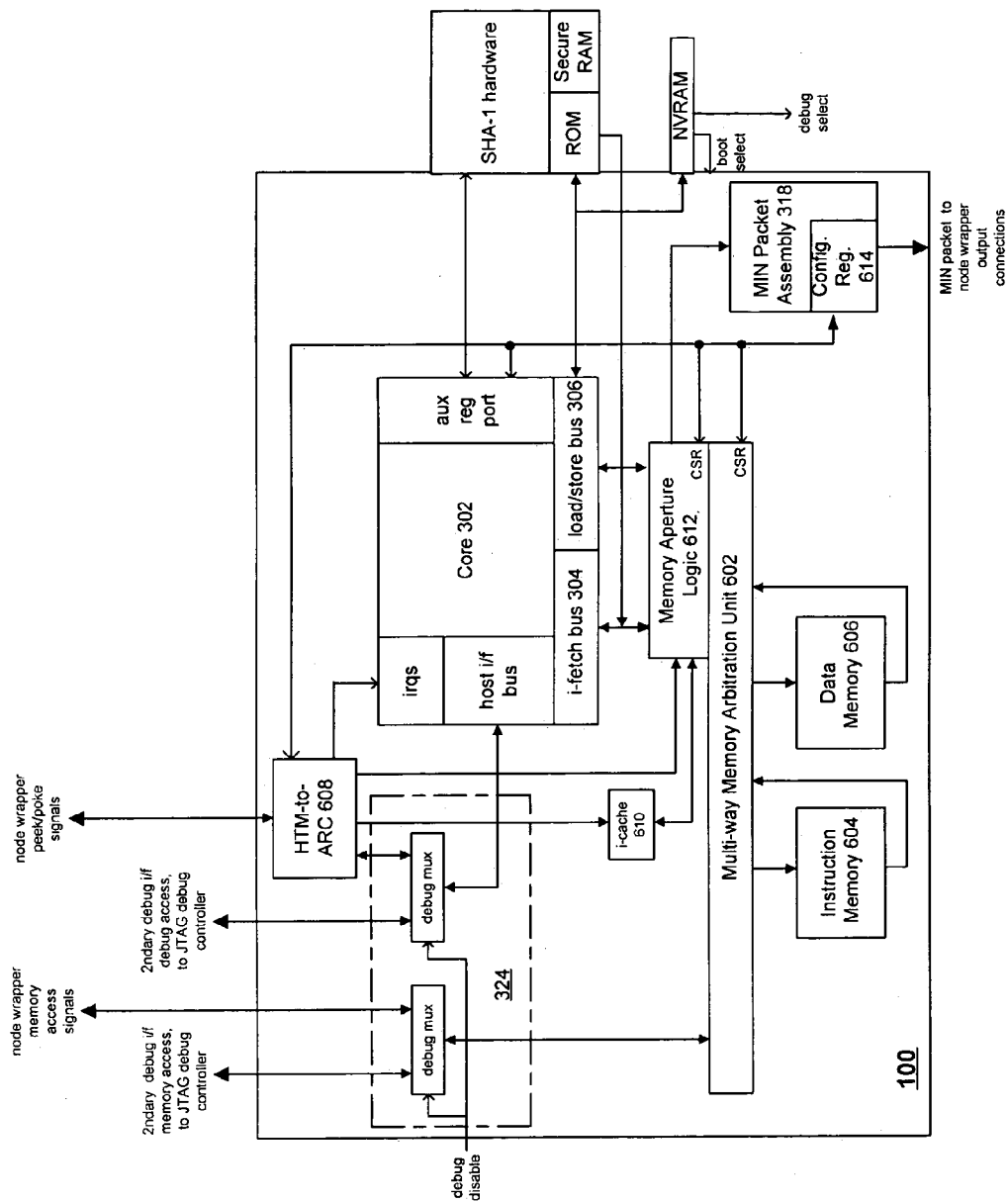
FIG. 6 is a block diagram of another embodiment of a PSN node that may be operated as either a k-node or a PSN node in accordance with an embodiment of the present invention.

Referring now to FIG. 6, an alternative embodiment of a microprocessor-based node 100 is illustrated. The primary difference between the two embodiments resides in the configuration of the node as either a k-node or as a PSN and in memory access.

Configuration registers 614 contain the parameters for memory 606, which, if necessary, map a task's logical data memory access to physical addresses. Essentially, the mapping process establishes a protected memory page that bounds all load/store requests to a region of the physical memory. If a memory access is not within the task's allotted page size, the address wraps to the beginning of the physical memory access range allocated, thus a garbage read or an overwrite situation can occur in this case. In addition, if the memory access goes beyond the physical memory size, a memory exception is generated and the address bits held at the last address (at all ones).

The memory arbitration unit 602 has possible three memory clients to serve, i-fetch 304 and load/store 306, and a memory access from the node wrapper trying to access a nodal memory through HTM-to-ARC 608. Its main function is to arbitrate between processor unit 114 access and node wrapper access 103 to local node memory 112. Memory arbitration unit 602 grants and halts these memory client requests as necessary to maximize throughput. The memory arbitration unit 602 manages nodal memory sources including the local instruction and data memories 604 and 606, respectively. Memories 604 and 606 each have individual read and write ports.

If transaction were targeted at other nodes, these memory requests pass directly to the MIN packet assembly 318, which packetizes the memory request to send to other memory controllers sitting on the MIN.

Memory aperture logic (MAL) 612 determines whether a memory request is 1) local memory access, 2) external memory access (including bulk, external, a peek/poke accesses), or 3) input or output buffer access, from either the ifetch 304 or load/store 306 buses.

In the MAL 612 block, the configuration registers contain the Memory Access Scope (MAS) parameters for the memories, which, if necessary, could map task's data memory access to physical addresses depending the base address set and limited by the configured buffer size (power-of-2). Essentially, this establishes a protected memory page that bounds all load/store requests to a region of the physical memory.

If a memory access is not within the task's allotted page size, the address wraps to the beginning of the physical memory access range allocated, thus a garbage read or an overwrite situation can occur in this case. In addition, if the memory access goes beyond the physical memory size, i.e. in the case of bulk page base address 0x7c000 with bulk page size 128 kB for example, a memory exception will be generated and the address bits held at the last address (at all ones). Furthermore, if the k-node sets the MAS_LOCK register, programs ruing on the PSN cannot reconfigure these registers. This feature gives the k-node the ability to secure a memory page for a particular PSN so that all programs running on it can only access a given region of the physical memory.

When operating as a k-node, the PSN runs the operating system for the ACE. In the k-node, the PSN is used to adapt other nodes to perform a function in much the same way that a subroutine may be called in a software program to perform a particular function. Further, the k-node manages data flow between nodes.

In the k-node, register 614 is set so that programs running on the k-node cannot reconfigure node parameters. This feature enables the k-node to secure a memory page for a particular PSN so that all programs running on it can only access a given region of the physical memory.

In one embodiment, a node specific security configuration register 614 physically resides in MIN Packet Assembly 318. The security configuration register contains a security bit that determines whether PSN node is used as a k-node or as a PSN. When the security bit is set, MIN words sent out by the MIN Packet Assembly 318 include a full range of MIN service words. Thus, the security configuration register bit at address 0x1000 determines the security status of the PSN. If the bit is set to a logical one, the node is a k-node, otherwise the node is a PSN node.

In additional to bulk and external memory random accesses in PSN, the k-node posses the ability to peek and poke node registers and node memory spaces. However, all memory mapped accesses regardless of peek/poke or memory random access is done through ARC load and store instructions. The address appeared on the load/store bus is used to decoded what kind of MIN service to use for a given load or store request. If it is accessing the actual bulk or external memories, the memory random access MIN service will be used.

In the k-node, the embedded ROM and Secure RAM, two consecutive memory regions respectively, are connected to ARC local load/store bus, which bypasses all memory arbitration and are accessed directly. Both instruction and load/store access can read the content of the ROM through the same address range. The top 192 bytes of the ROM are occupied by the pico-codes needed to run the SHA-1 hardware. The top 256 bytes of Secure RAM are shared with SHA-1 hardware so both ARC and the SHA-1 have access to these regions of memory. However, neither the MIN nor the debug port can peek or poke directly to these two regions.

An internal nonvolatile memory (NVRAM) is directly connected to load/store bus 306 in order to bypass memory arbitration. Only a program running on the k-node can access the content of the NVRAM and neither the MIN nor the secondary debug port can access directly into this memory. The physical size of NVRAM is 84×1 in one embodiment, in which the security key resides in the least significant 80 bits. The top word in the NVRAM contains security parameters for debug disable, boot enable, and Device ID.

When Debug Disable is enabled, the secondary JTAG debug has access to k-node internal registers and memory. The JTAG debug and MIN accesses share the same connections into the ARC. Therefore, they are multiplexed, but a MIN access will always halt the JTAG access. When Debug Disable is asserted, the MIN access is the only gateway into k-node internal registers and memories. The secondary debug interface from the JTAG controller is meant for bring-up and initial debugging of codes on the k-node.

In the PSN, the ARC will stay in a reset state until cleared by a k-node command upon a system reset. The k-node loads the nodal memory with instructions for each PSN and then turns on the execution unit or core 102 of the PSN. When the k-node comes out of reset, it jumps to location 8000H and starts execution from the boot ROM. Thus, the k-node initiates its environment first and then begins the process of initiating operation of the PSN and other nodes comprising the system.

A chip level BOOT_SEL (not shown) will have a software window for the boot code running on the k-node through the following auxiliary register access. The initial boot loader residing on the internal ROM can read the state of this pin, and decide the location where the rest of the boot program resides, either present in the, flash memory attached to the integrated circuit or housed in a host processor. For example, if the BOOT_SEL pin is tied low externally, this can indicate the presence of a flash memory connected to the external memory controller with the boot codes programmed in it. Thus, the initial boot loader can jump to the flash memory location and execute the rest of the boot sequence. On the other hand, if this pin is tied high externally, it indicates the absence of the flash memory. Thus, the initial boot loader waits for the host processor to give the k-node the start location of the rest of the boot codes.

Referring again to FIG. 3, where the node is configured as a general purpose RISC node, it is typically used for decision intensive applications requiring large code space. To illustrate, the PSN may be adapted to perform digital signal processing (DSP) functions at one point in time and then adapted to process digital photographic images. As used herein, RISC refers to a reduced instruction set computer.

Microprocessor-based node 100 also includes timers, an interrupt controller and clock gating circuits. In one embodiment, timers include two 32-bit programmable timers that are by default initially disabled. Two timers are software controllable by application software programs and will generate interrupts as is well understood in the art.

When a memory read request goes off-node, additional timers prevent the system from hanging when an external memory read, external memory write or an on-chip peeks to any register or memory is attempted and an error occurs. The timer starts to count down as soon as a request is generated. When the timer times out, a memory exception is generated.

The interrupt controller is a two-level priority mask-able system that can accommodate up to nine interrupts. The interrupt system expects a vector table residing at a specific instruction address for all interrupts except the reset vector. The reset vector is hard coded to address 0x0 of an internal boot ROM in the k-node at address 0x8000.

Clock gating provides low power operation. More specifically, the clock tree driving processor unit 114 pipeline is automatically gated whenever operation is halted or the system is in the sleep mode. However, even in the sleep mode, configuration status registers and memories provide access to the host. In the sleep mode, the clock is gated only if all of following conditions are met:
 1. The processor unit 114 is halted or is sleeping after the pipeline has been flushed;
 2. A memory request is not being serviced;
 3. The host is not accessing the processor unit 114;
 4. There are no interrupt requests to service; and
 5. All memory chip enable (or clock enable) signals are deactivated to power down the memories.

Figure 7:
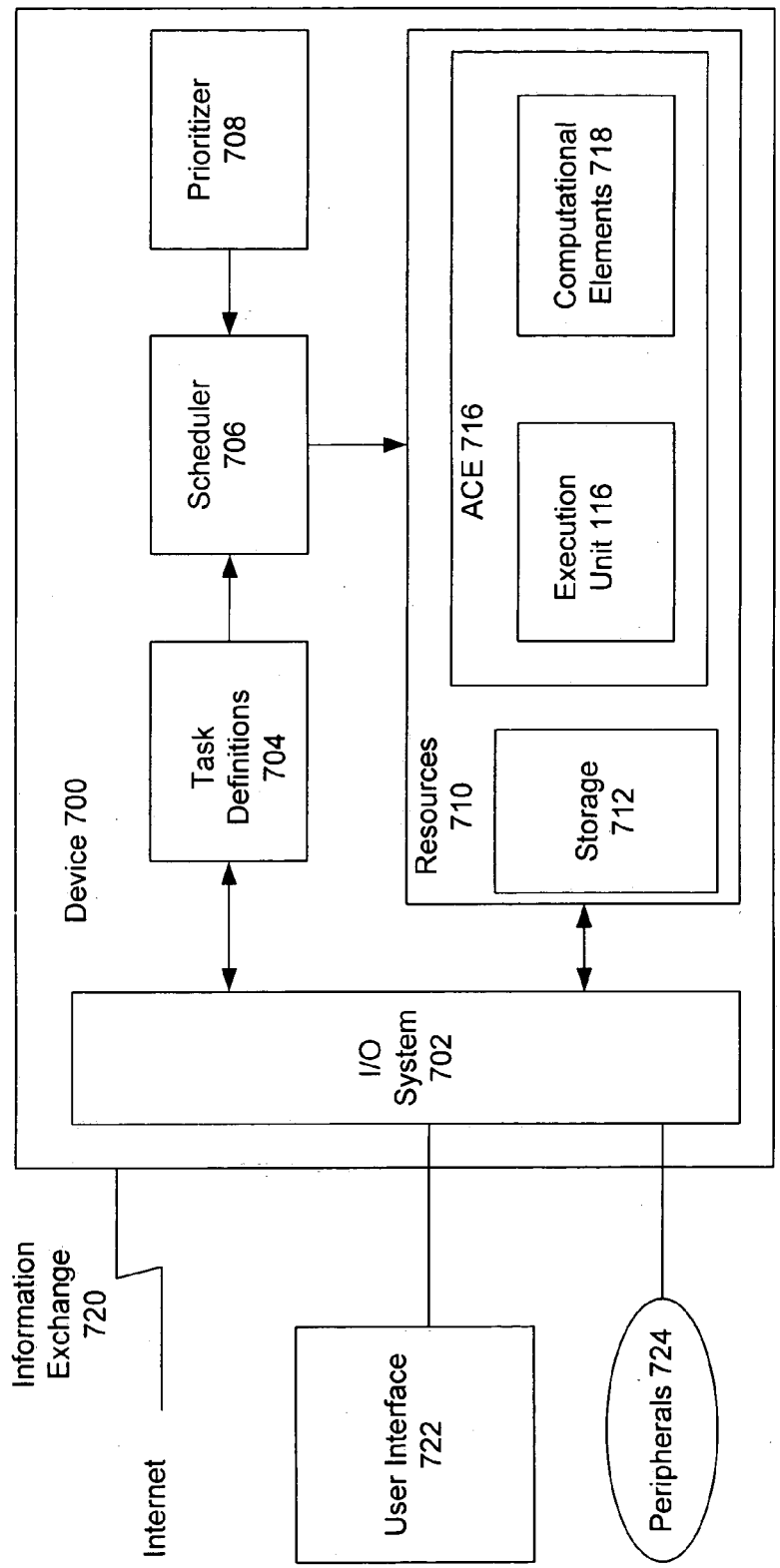
FIG. 7 is an illustration of a device that includes at least one adaptive computing engine in accordance with an embodiment of the present invention.

Refer now to FIG. 7, which illustrates a typical application of an embodiment of the invention. In FIG. 7, device 700 includes other devices, components, systems, subsystems, circuits, etc. For example, device 700 can be a consumer electronics device such as a cell phone, personal digital assistant (PDA), global positioning system (GPS) receiver, etc. In general, device 700 can be any type of device that can benefit from a processing engine.

Device 700 includes input/output (I/O) system 702 for providing data exchange with the external environment (illustrated at 720), connection to peripherals 724 and interaction with a human user via user interface 722. Data exchange includes exchanges with digital networks such as the Internet, local and campus intranets, communications infrastructures such as a telephone network, radio frequency exchanges as to wireless networks, etc. Any type of physical communication or data transfer network can be employed. Any type of protocol can be used to perform the communication.

User interface 722 allows a human user to operate the device, and to perform other functions. Typically, a user interface includes a display screen and manual controls such as buttons, a pointing device (e.g., a mouse, trackball, touchpad, etc.), knobs, switches and other types of controls. Additional output devices can include speakers, force feedback, etc. Peripherals 724 include storage devices such as disk drives, input/output devices such as keyboards, monitors, etc.

I/O system 702 can be in communication with different systems in device 700. For example, FIG. 7 shows I/O system 702 communicating with task definitions store 704 and storage and processing resources 710. Other arrangements are possible.

Task definitions store 704 is used to store programs, adaptation or configuration information, or other information used to control or manage the processing or functioning of device 700. In a preferred embodiment, adaptation information is used to define tasks that are executed by systems within device 700 to achieve functionality. For example, a task definition might allow device 700 to communicate using time-division multiplexed access (TDMA) with a cellular telephone network. Another task could provide a user with a phone directory including an interface for creating, modifying, organizing, searching, etc., the directory. Yet other tasks can implement a time-of-day clock, Internet web browsing, GPS position indicating, calculator, email interface, etc. Any type of functionality can be provided by a task definition. Combinations of functionality can be provided by one or more definitions. Further, a definition may provide only a portion of a feature, function or other process or functionality.

Scheduler 706 causes tasks, or portions of tasks, from task definition store 704 to be executed. Scheduler 706 can, optionally, use information provided by prioritizer 708 in determining how to specify the use of resources 710 to be used to execute a task. For example, scheduler 706 can assign all resources to a task that has been given high priority by prioritizer 708. Conversely, scheduler 706 may reduce resources allocated to a task, or suspend execution of a task, if the task has low priority.

Resources 710 include storage 712 and processing resources 714. Storage 712 can be, for example, system memory in the form of random-access memory (RAM) or other forms of storage. Storage can be distributed throughout the processing elements or it can be centralized. Processing resources 714 includes common types of processing resources such as general-purpose processors, finite-state machines (FSMs), application-specific integrated circuits (ASICs), etc. A preferred embodiment of the invention relies on adaptive computing environment (ACE) 716 that includes multiple processing elements, or "nodes," also referred to as computational elements. Each node is of a specific type such as math, bit/logical, FSM or reduced-instruction set computing (RISC). Nodes are interconnected and may have associated resources, such as memory.

The temporal nature of the device 700 architecture should also be noted. At any given instant of time, utilizing different levels of interconnect, a particular configuration may exist within the ACE 716 that is optimized to perform a given function or implement a particular algorithm. At another instant in time, the configuration may be changed, to interconnect other computational elements or connect the same computational elements differently, for the performance of another function or algorithm.

Two important features arise from this temporal adaptablity. First, as algorithms may change over time to, for example, implement a new technology standard, the computational elements 718 may co-evolve and be reconfigured to implement the new algorithm. This temporal re-configurability of computational elements, for the performance of various different algorithms, also illustrates a conceptual distinction utilized herein between configuration and reconfiguration, on the one hand, and programming or reprogrammability, on the other hand. Typical programmability utilizes a pre-existing group or set of functions, which may be called in various orders, over time, to implement a particular algorithm. In contrast, configurability and recoligurability, as used herein, includes the additional capability of adding or creating new functions which were previously unavailable or non-existent.

Figure 8A:
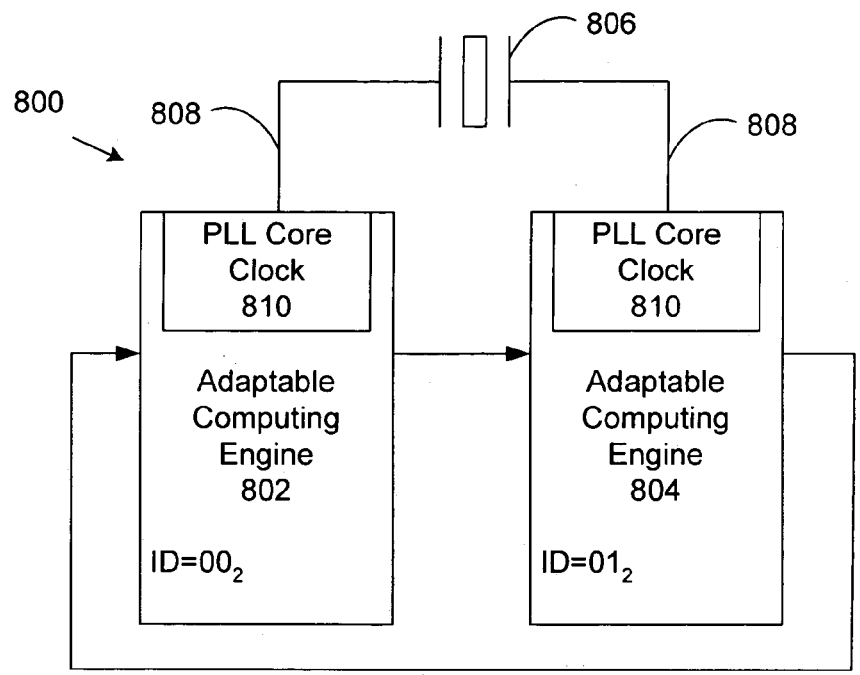
FIGS. 8A and 8B each illustrate multiple, interconnected ACE devices operating under the control of a single kernel node in accordance with an embodiment of the present invention.

Certain algorithms and functions may require more computational elements than provided by a single ACE 200 device. Accordingly, it may be necessary to interconnect two or more ACE devices to increase the number of available computational elements. FIG. 8A illustrates a system 800 that includes two ACE devices coupled in a ring topology. One of the devices, specifically, ACE 802 is designated the master or control device having a k-node. The other device, ACE 804, does not necessarily include a k-node but if present, it may be configured to function as a PSN node. ACE 804 provides additional computational elements that operate under control of the k-node in ACE 802. Typically, both devices are packaged in separate electronic packages and mounted on a circuit board that provides the interconnection traces in a manner well known to those skilled in the art although hybrid modules, where the semiconductor die for the two devices are mounted on a common substrate, are contemplated by the present invention as well.

A common reference clock is routed to each device. In one embodiment, a crystal 806 generates the common reference clock having a frequency that is preferably between 10 MHz and 200 MHz with the actual clock rate dependant on the applications to be executed by ACE 802 and ACE 804. Due to the potential for high clock rates, it is important that clock traces 808 on the circuit board coupling crystal 806 to each device have equal length so that transmission delay of the clock to each device is the same.

At ACE 802 and ACE 804, the clock input is connected to identical phase locked loop (PLL) circuits 810. Each PLL circuit 810 may be configured to operate in a by-pass mode such that the clock signal is simply passed on to the core logic of ACE 802 and ACE 804. Alternatively, PLL circuit 819 may be configured to generate a PLL generated clock that has a higher frequency or a lower frequency relative to the clock signal derived from crystal 806. Based on the above description, one skilled in the relevant art will recognize that the PLL generated clock signal (at the output of the PLL circuit 810) of ACE 802 will be of the same frequency and in phase with the PLL generated clock signal of ACE 804. Selection of an appropriate PLL circuit design is an engineering decision and many suitable well-known structures are readily available. Accordingly, the PLL circuits are not specifically shown or described in detail to avoid obscuring important aspects of embodiments of the present invention.

Each ACE device also includes a device identification number or device ID. A device ID of zero identifies the master or control ACE device that includes the k-node. In the illustrated embodiment of FIG. 8A, ACE 802 is assigned device ID zero and serves as the device responsible for controlling the boot-up sequence and for configuring and initializing the other devices.

In operation, ACE devices use a dataflow task-based programming methodology using streams of packets containing data and control information. Ports send and receive data and control information and invoke and trigger task execution. Thus, whenever a node on a device submits a packet to the device's MIN, the MIN examines a device ID field associated with the packet to determine where to route the packet. If the device ID field of the packet, which in the preferred embodiment comprises two bits, matches the ID for that device, then the packet is routed to the node destination within the device. If the device ID field does not match the device ID for that same device, then the packet is routed to an output port for delivery to the specified device.

Figure 8B:
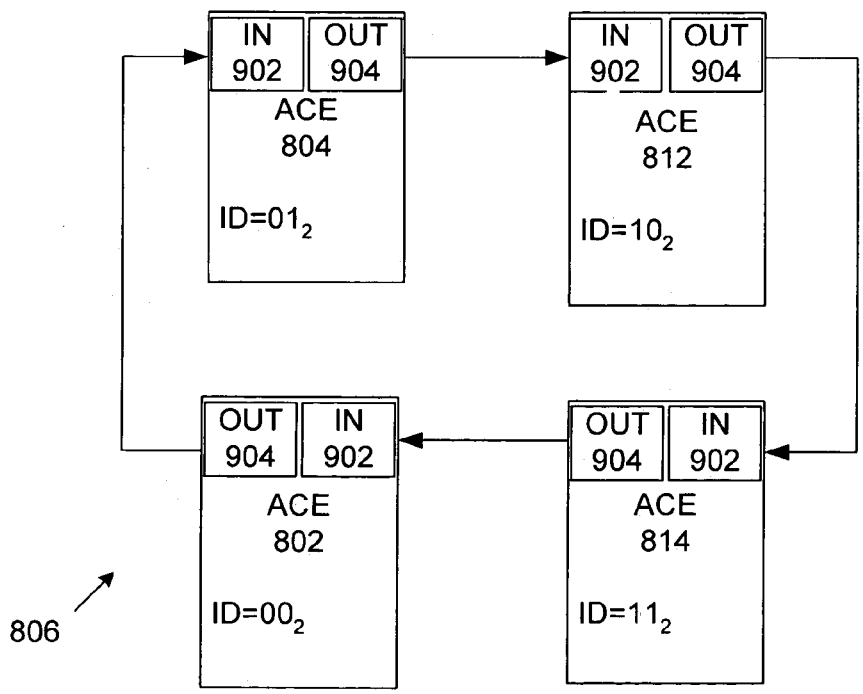

FIG. 8B illustrates the ring topology for four cascaded ACE devices 802, 804, 812 and 814 with each device receiving packets at an input port and sending packets on to the next device in the ring at an output port if the packet's device ID does not match the ID of the device. In the system illustrated in FIG. 8B, multiple cascaded devices are connected in a ring topology and the ports NetIn 902 and NetOut 904 transfer packets from device to device around the ring. In accordance with an embodiment of the present invention, any number of ACE-devices up to four may be coupled in the described manner. Other embodiments may use any suitable number of devices and any type of arrangement or coupling.

Figure 9:
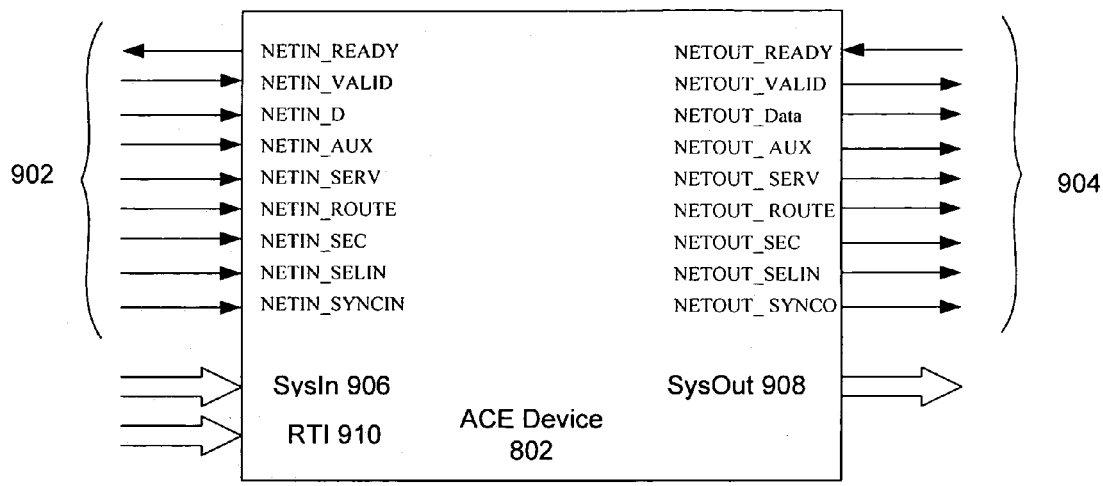
FIG. 9 illustrates the input and output ports of an ACE used in implementing an interconnection ring topology in accordance with an embodiment of the present invention.

FIG. 9 illustrates the NetIn 902 and NetOut 904 ports in more detail. NetIn 902 port comprises an input "Valid" signal indicates when transmitted data is valid and available for transmission to the receiving device. The transmitting device provides data (31-bits) and control (18-bits) information and holds the data until it receives acknowledgement that the receiving device is available to receive the information. The control information comprises a six bit auxiliary field (NetIn_Aux) which can be a port number, an encoding or other item that is a function of other fields, a four bit service field (NetIn_Serv) which may be utilized for various purposes as defined by the k-node during the initialization process, an eight bit route ID (NetIn_Route), a security bit (NetIn_Sec) and a two bit frequency indicator (NetIn_Selin). The two bit frequency indicator indicates whether data transfer is at full speed, half speed or quarter speed. The receiving device provides a "Ready" signal to indicate when it is available to accept a data transmission. The receiving device receives the Valid signal and begins the transfer for so long as the Valid signal remains asserted. The receiving device also receives the data and control information on correspond inputs.

In operation, upon receipt of the Ready signal, the transmitting device begins to clock out the data at the selected I/O transfer rate. When the transfer rate is divided-down relative to the PLL generated clock, a clock sync signal indicates the phase that the interface operates on. The receiving device receives the sync signal at a corresponding input.

When a node within an ACE device sends out a packet, that packet contains a two-bit Device ID field and a six-bit node ID field. If the device ID field of the packet does not match the ACE device that includes the originating node, the MIN routes the packet to the NetOut port. Each packet coming into the device via the NetIn port 902 has the Device ID field checked by the MIN. If the packet is not destined for that device, it is sent back out on the NetOut port 904 to the NetIn port 902 of the next device in the ring.

The next ACE device in the ring receives the packet on its NetIn port and the MIN examines and routes it according to the same rules. A packet marked with a device field not matching any ACE device in the system is discarded by the MIN by that ACE device. The MIN is loaded by the k-node with a count of the number of ACE devices in the ring and will not forward packets on if it the device ID is not valid. In the ring topology, the NetOut port of each device is coupled to the NetIn port of the next device on the ring. This ring topology is illustrated in FIG. 8A where the NetOut port of ACE 802 is coupled to the NetIn port of ACE 804. Similarly, the NetOut port of ACE 804 is coupled to the NetIn port of device ACE 802 to complete the ring. One skilled in the art will appreciate that the ring topology enables each device in pass packets to other devices, in one direction, around the ring with a minimum of overhead control.

In addition to the NetIn 902 and NetOut 904 ports, each ACE device further includes SysIn 906, SysOut 908 and Real-Time-Input (RTI) 910 ports. These ports function as the hardware interface to and from external system components, such as coprocessors, user interfaces or external memory. The SysIn 906 and SysOut 908 ports provide an input highway for data to be processed and an output highway for results to be forwarded to external system components, respectively. These ports can couple directly to the coprocessor if it has its own I/O subsystem that can be programmed to service requests from the ACE devices. Alternatively, the ports can connect to the coprocessor through a bridge sub-system via a standard bus. The SysIn and SysOut ports are similar to the NetIn and NetOut ports, respectively, except that the SysIn and SysOut ports do not include the security bit and SysOut does not include four bits that are normally used for node routing information. However, these four bits can be used to select external devices and have a router direct the packet to the desired device.

RTI 910 port handles incoming real-time data stream that is treated as the highest priority data stream by each device. RTI 910 port is typically connected to a pipelined data source, for instance the output of an Analog-to-Digital Converter (ADC), which is always available and which can be fully utilized when required by an application or function. The real-time data entering the ACE device via the RTI 910 port may be broadcast by the MIN to any or all nodes within the device as required by the application or function.

Figure 10:
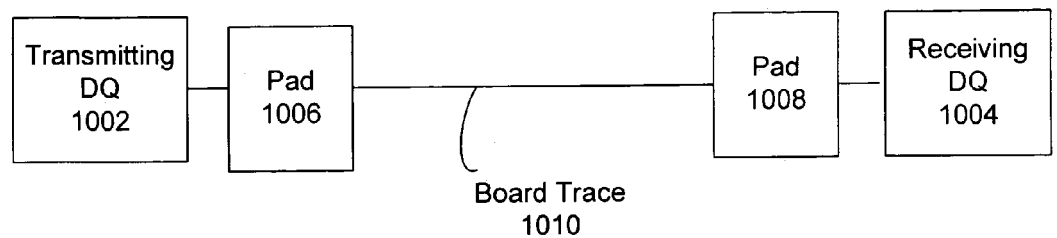
FIG. 10 illustrates one embodiment of inter-device signal registration circuits in accordance with an embodiment of the present invention.

In the preferred embodiment, the present invention achieves high-speed and reliable inter-device communication by registering all data and control signals on both ends of each signal line. FIG. 10 illustrates the inter-device signal registration where each signal is immediately registered by D type flip-flops 1002 and 1004. These flip-flops are positioned as close as possible to the internal bonding pads 1006 and 1008 of both the transmitting and the receiving ports, respectively. Further, each signal path is matched so that each path will have substantially identical impedance and gate delays.

Figure 11:
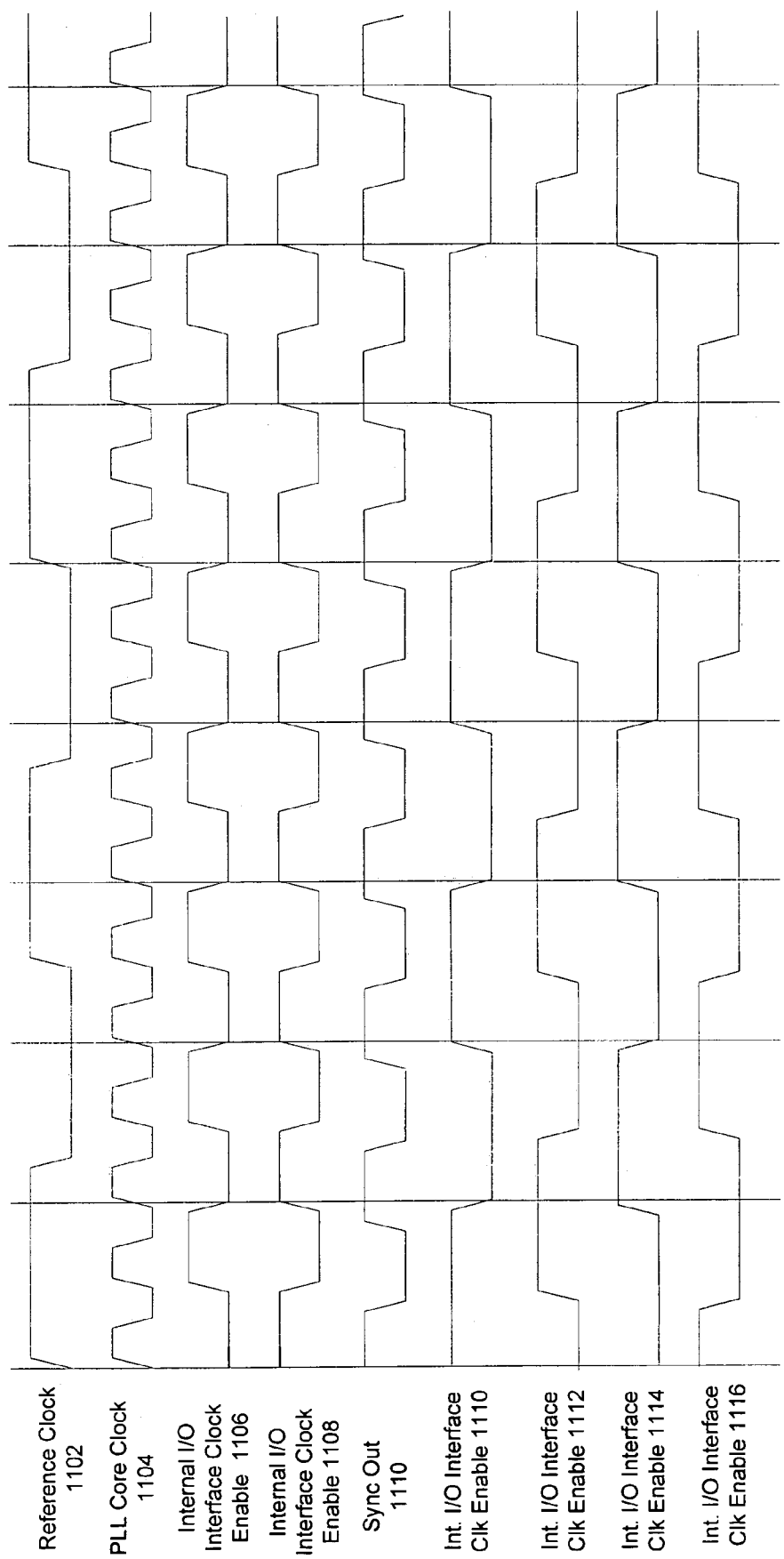
FIG. 11 illustrates a timing diagram for the transfer of information between devices using the interconnection ring in accordance with an embodiment of the present invention.

Some applications may require a PLL generated clock rate of 200 MHz or greater to achieve a desired function or to timely execute an algorithm. In such applications, it is necessary to transfer data between devices at a lower rate such as is illustrated in FIG. 11A where the output of clock crystal 806 is shown at 1108 and is used to generate the PLL clock signal for all ACE devices. The PLL circuit 810 generates the core logic clock 1104, which defines the clock domain for each ACE device. As described above, the frequency of the PLL generated core logic clock will be the same for each ACE device.

When the PLL generated clock exceeds about 100 MHZ, multi-layered circuit board technology dictates a lower inter-device communication rate because of signal delays associated with lead lengths and package and circuit board capacitance. In such applications, it is necessary to provide a lower transfer rate for the inter-device communication logic but it is not desirable to define additional clock domains. Accordingly, an embodiment of the present invention provides an I/O interface clock enable signal that is used to update the output of the D type flip-flops. However, if the lower transfer rate is selected to be one half of the PLL generated clock, it will be appreciated that there are two possible phase relationships that the I/O interface clock enable signal may take relative to the PLL generated clock. It will further be appreciated that the I/O interface clock enable signal of adjacent ACE devices on the ring may both have the same phase relationship or may be out of phase one with respect to the other. The two possible I/O interface clock enable signals for a divide by two embodiment are shown at 1106 or 1108 where it will be observed that signal 1104 is out of phase with respect to signal 1108. If the lower transfer rate is selected to be one fourth of the PLL generated clock, it will be appreciated that there are four possible phase relationships that the I/O interface clock enable signal may take relative to the PLL generated clock. It will further be appreciated that the I/O interface clock enable signal of adjacent ACE devices on the ring may both have the same phase relationship or may be out of phase by one, two or three clock cycles. These possible phase relationships for a "divide by four" I/O interface clock enable signals are shown at 1110–1116 each device may synchronize on the same clock edge or on either the second, third or fourth reference clock edge. Since it is not possible to guarantee that each device will always synchronize with the same edge of the PLL generated clock signal during power-up or reset conditions, there may be as much as a n−1 phase difference between each device on the ring, where n is either two or four.

Figure 12:
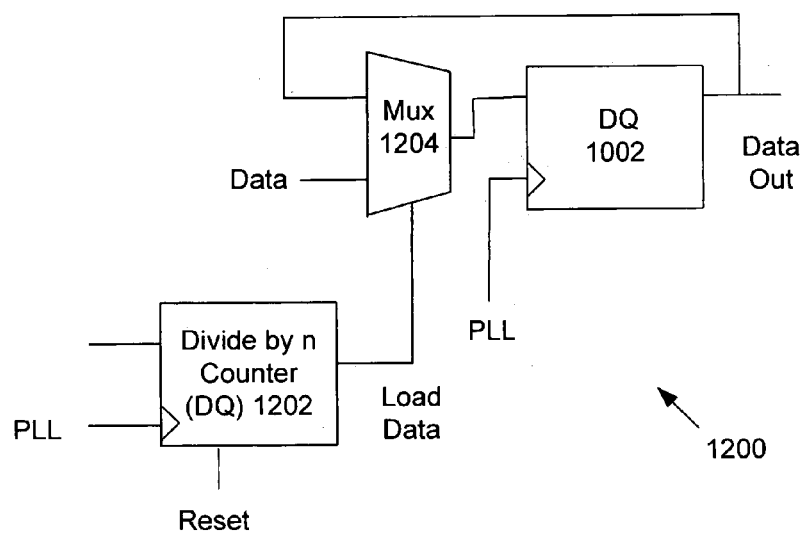
FIG. 12 illustrates an input/output interface clock enable that is derived as the output of a counter circuit in accordance with an embodiment of the present invention.

In one preferred embodiment, the I/O interface clock enable is derived as the output of a counter circuit 1200, which is illustrated in FIG. 12. Counter circuit 1200 includes a counter 1202 that begins counting PLL generated clock pulses upon power up or when a reset signal is applied to the reset input of counter 1202. When the counter counts to the selected number of PLL generated clocks, the output switches state to derive the divide by n I/O transfer clock enable signal. The transfer rate may be selected on the circuit board by configuring jumpers to control the counting range of counter circuit 1202. If n is selected to be two, counter 1202 counts from 0 to 1 and then changes the output state. If n is selected to be four, counter 1202 counts from 0 to 3 before the output state is changed. Thus, every two or four PLL clocks cycles, depending on the jumper configuration, the output of counter 1202 will generate a single clock cycle. However, as previously noted, there is no assurance that each ACE device on the ring will begin counting on the same PLL generated clock pulse.

The output of counter 1202 is used as a load signal and is coupled to the select input of a two input mux 1204. Mux 1204 receives the data (or the control information) to be transferred to the receiving device on one input and the current output of D type flip flop 1002 on the other input. Data (or control information) at the input of mux 1204 is clocked through to flip flop 1002 at half the rate of PLL clock. Advantageously, the I/O logic is clocked at the PLL generated clock rate so all logic on each ACE operates in a single clock domain.

In other applications, the core logic may operate at a relatively low frequency, such as by way of example 100 MHz. In such embodiments, both the core and the inter-device communication logic may operate at the same rate and logic and data signals are readily transferred. FIG. 11B illustrates one embodiment where inter-device communication proceeds at the same rate as the core logic. In this embodiment, the sync signal Referring now to FIG. 13A, the relationship between the clocks, data and a synchronizing, or synch, signal 1302 is shown. Synch signal 1302 is provided to overcome the problems caused by the potential of device-to-device phase shifting of the I/O interface clock enable signals. Accordingly, each transmitting device generates its own synch signal 1302 that is sent to the receiving device along with data and other control signals. Sync signal 1302 is generated by clocking the I/O interface clock enable signal through an output D type flip-flop/pad combination such as is illustrated in FIG. 10 so that the signal has the same gate and pad delay as the data and other control signals. In the timing diagram shown in FIG. 13, sync signal 1302, data 1308 and data valid 1306 are all shown at the pad of the transmitting device. The corresponding delayed signals are shown at sync-in 1310, data-in 1312 and data valid-in 1314 upon arrival at the pads of the receiving device.

The receiving device registers synch-in signal 1310 along with the valid data. Because sync-in signal 1310 has the same gate and board delay as the data and control signals, the sync signal retains the proper timing relationship with the data and control signals. The skew introduced by gate and circuit board trace delay to sync signal 1302 is readily apparent by comparison to sync-in signal 1310 and its alignment with data-in 1312 and data valid-in 1314.

When sync-in signal 1310 arrives at the receiving device, it is registered by D type flip-flop 1416. On the next I/O interface clock enable signal, the sync signal 1302 propagates to resets the counter circuit that controls the receiving device's I/O interface clock enable generating circuit. In this manner the I/O interface clock enable signal on the receiving side is properly aligned with respect to the received data. Thus, even if the I/O interface clock enable on the receiving side is out of phase with respect to the transmitting clock enable, valid data will clocked out of the registers at the proper time.

Figure 14:
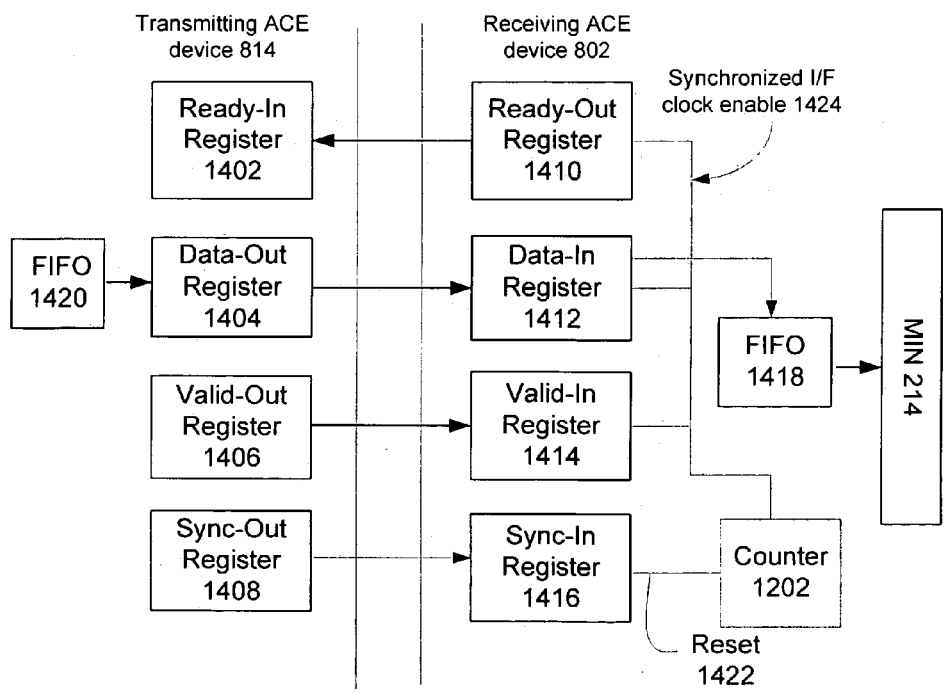
FIG. 14 illustrates the interconnection between an input port and an output port of two ACE devices in accordance with an embodiment of the present invention.
Figure 13A:
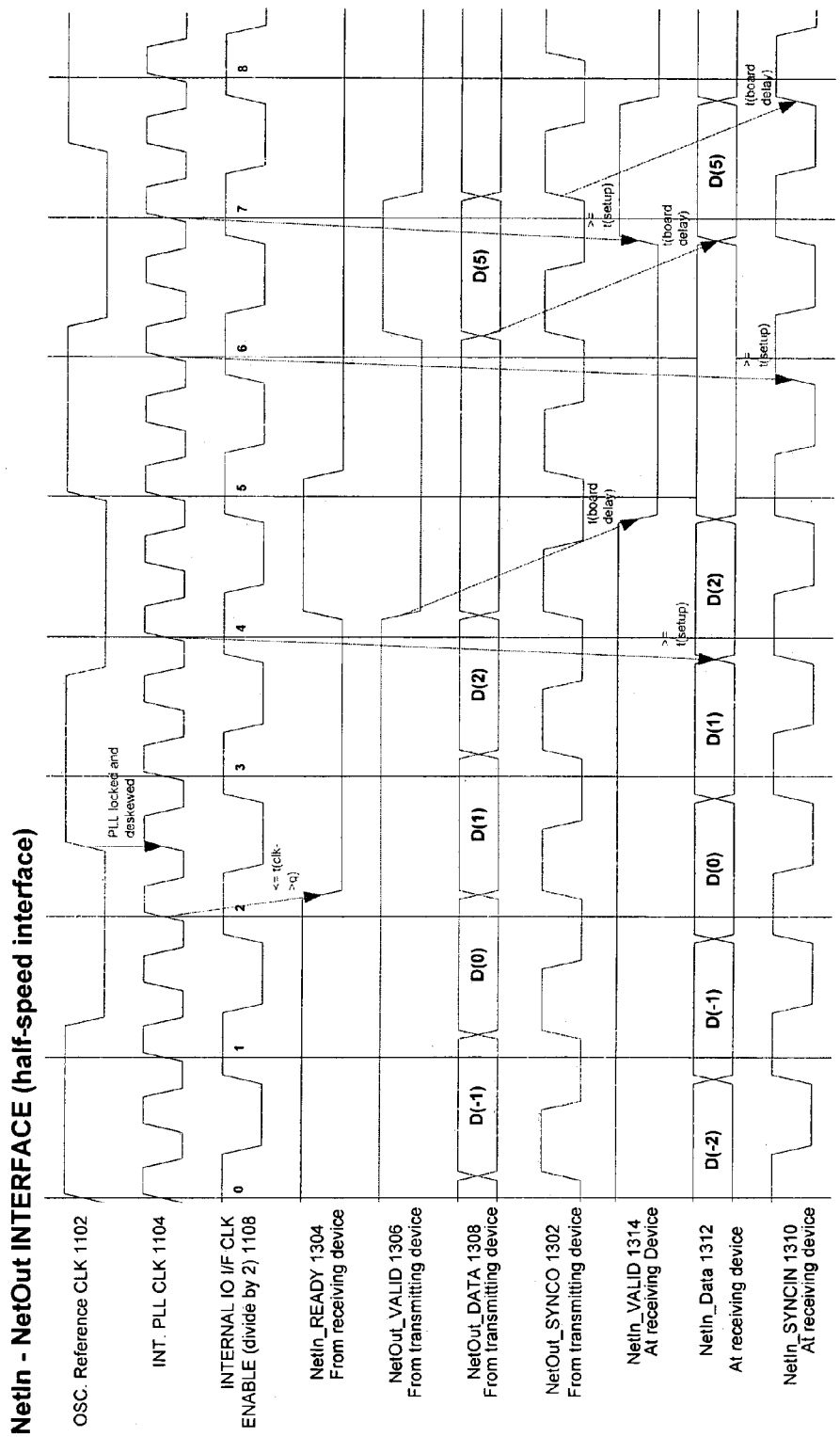
FIGS. 13A and 13B show timing diagrams that illustrates the relationship between the clocks, data and a synchronizing signal in accordance with a half speed and a full speed embodiment of the present invention.

Data transmission between ACE devices on the ring is now more fully explained in conjunction with the timing diagram of FIG. 13A and the interface circuitry shown in FIG. 14. By way of illustration, the NetOut port of a transmitting device such as ACE device 814 is coupled in the ring topology to the NetIn port of a receiving device, ACE device 802 (see FIG. 8B). Where the transmitting ACE device registers the data valid signal in register 1406 of the NetOut port for transmission to a corresponding register 1414 at the NetIn port of the receiving device. The sync signal 1302 is likewise registered by register 1408 for transmission to a corresponding register 1416 at the NetIn port. The output of register 1416 is used to reset counter 1202 by transmitting the signal along conductor 1422. The output 1424 of counter 1202 is the phase adjusted interface I/O clock enable signal that is propagated to registers 1410–1414. In this manner, the inter-device protocol control or handshake signals, Ready 1304 and Valid 1306 are phase corrected and data is readily recovered.

The transmission protocol requires that the receiving device indicate when it is available to receive data. This indication is made when the receiving device sets register 1410 to a logic HIGH to generate Ready 1304 signal. Because of pipeline-register delays in the control path that are necessary for the highest-speed signaling between ACE devices, the receiving device must have enough buffer space for at least four extra transfers of data after the Ready signal is changed to a logic LOW. This space is provided by an eight deep FIFO 1418, which receives data from the input register 1412. When FIFO reaches a point where it can only accept four additional transfers, the receiving device switches the Ready signal to a logic LOW. When ready signal is switched to logic LOW, there are two additional transfers in the pipeline that will be received by FIFO 1418. Two additional transfers may occur before the Ready signal propagates to the transmitting device. A counter associated with FIFO 1418 keeps track of the number of transfers the buffer is able to accept.

On the other side of the transmission, the transmitting device will indicate that it has data ready to send by setting register 1406 to a logic HIGH to assert the Valid signal 1306. The transmitting device must accept and hold up to an additional two pending transfers of data. FIFO 1420 is a two-entry buffer that permits full-bandwidth transfers without back pressuring the MIN. It is to be understood that FIFOs 1418 and 1420 may provide additional capacity for storing transferred data and are not to be limited to the six and two transfers, respectively, which are the minimum FIFO depths to provide the flexibility to transfer data between ACE devices. However, the FIFO depth may be increased in other embodiments as dictated by engineering considerations.

In operation, data is transferred in and out of the FIFOs on every clock of the update rate signal and FIFO 1420 and FIFO 1418 will each contain one piece of data, and all control signals will remain active if the MIN is available.

Sync-in signal 1310 is registered by register 1408 so that it aligns properly with the data. It is registered at register 1416, again to maintain timing relationships. On the next I/O interface clock enable signal, the skewed sync signal 1310 propagates along reset line 1422 to reset counter circuit 1422. After being reset, the output of counter circuit 1422 generates the receiving device's I/O interface clock enable signal that is in phase, but skewed due to the various delay, with the transmitting I/O interface clock enable signal. In this manner the I/O interface clock enable signal on the receiving side is properly aligned with respect to the received data. Thus, even if the I/O interface clock enable on the receiving side is initially out of phase with respect to the transmitting device's I/O interface clock enable signal, the two enable signals will be brought in skewed synchronization such that valid data will be clocked into register 1410.

Figure 13B:
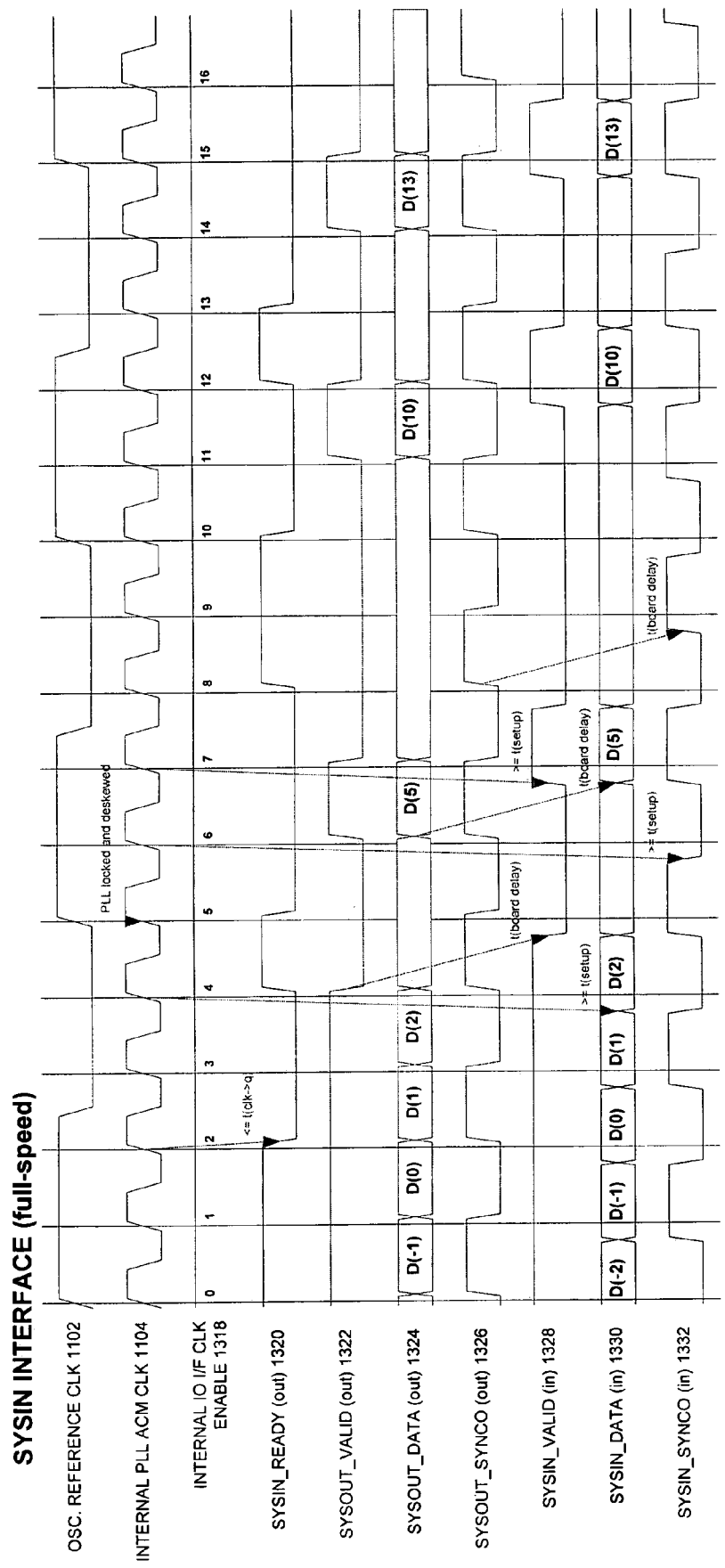

FIG. 13B shows the timing diagram for a full speed interface where the intra-device transfer rate is the same as the internal core clock rate. Although, the full speed SysIn interface timing is shown, it is to be understood that the NetIn interface timing is identical. Unlike the half speed interface, the internal input/output interface clock enable signal 1106 is not active because each device operates directly off of oscillator clock 1102. Accordingly, input/output interface clock enable 1108 is not used and remains at a logic HIGH when operating with a common core and input/output clock rate. The remaining handshake signals, SysIn_Ready 1320, SysOut_Valid 1322, SysOut_Data 1324 and SysOut_Synco 1326, which are shown at the transmitting device, together with the corresponding handshake and data signals SysIn_Valid 1328, SysIn_Data 1330 and SysIn_Synco 1332, which are shown at the receiving device, operate in the same manner as described for the NetIn interface. Advantageously, even if the internal PLL clock 1104 is out of phase at the receiving device in a full speed interface, there will be sufficient setup and hold time for data to be read at the receiving device.

Figure 15:
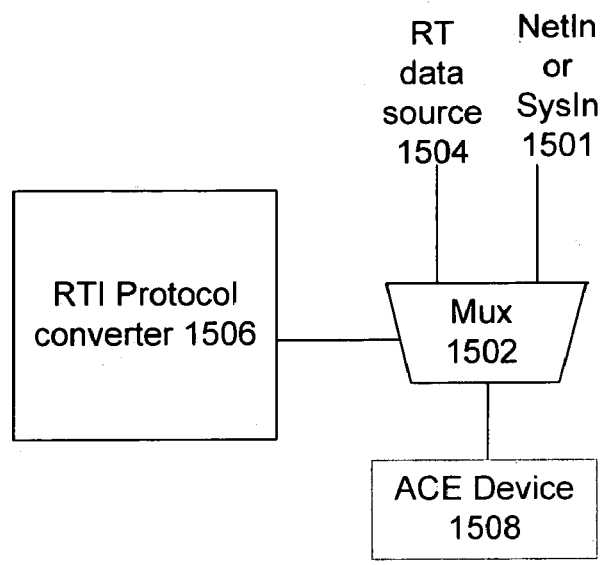
FIG. 15 illustrates one embodiment for multiplexing real-time data onto either a SysIn or a NetIn bus in accordance with an embodiment of the present invention.
Figure 16:
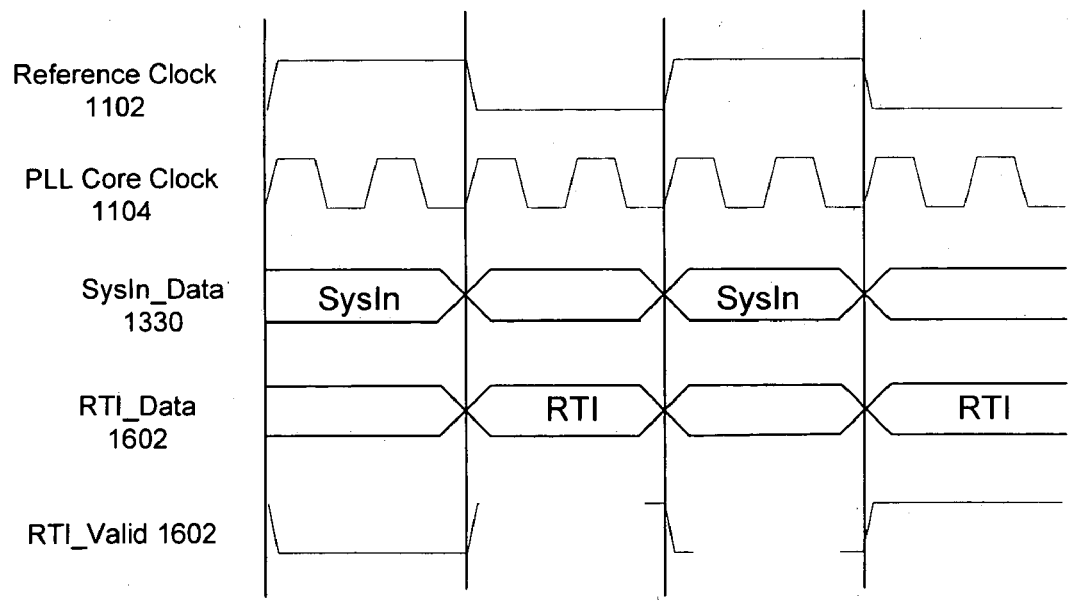
FIG. 16 shows a representative timing diagram for multiplexing real-time data onto the SysIn or the NetIn bus.

Refer now to FIGS. 15 and 16. FIG. 15 illustrates one embodiment for multiplexing real-time data onto either the SysIn 906 or the NetIn 902 bus while FIG. 16 illustrates a timing diagram for multiplexing real-time data to ACE device 1508. In one preferred embodiment, real-time data is transferred to the ACE devices by controlling a multiplexer 1502 to multiplex data from either a RTI bus 1504 or a bus 1501 to the ACE device 1508. Bus 1501 may be coupled to either the SysIn or the NetIn ports as required by a specific application. In a typical system configuration, one input port of multiplexer 1502 is coupled to either a host processor or another ACE device while the output of multiplexer 1502 is coupled to device 1508. The other input port is coupled to a real time data source 1504. The data source may be a keyboard, an analog to digital converter or other sources of streaming data.

When the RTI bus has data available, there are no explicit Ready or Valid signals because these signals are implied to be a logic HIGH. Rather multiplexer 1502 is controlled by a protocol converter 1506 that detects an interrupt indicating the availability of real-time data and allows data source 1504 to gain control of the ACE bus. When converter 1506 generates a control and routing signal, the MIN of ACE device 1508 accepts the RTI data in real time and routes it to the appropriate node or nodes in any ACE device on the ring.

FIG. 16 illustrates one embodiment where RTI data is provided to the MIN on the SysIn bus. For reference purposes, the oscillator reference clock 1108 and the internal PLL clock 1104 are shown. So long as the RTI_Valid signal 1602 is not asserted, SysIn_Data 1330 may be routed to the input port. However, when converter 1506 detects an RTI interrupt, the RTI_Valid signal 1602 is asserted and RTI_Data 1604 is placed on the bus by multiplexor 1502. At ACE device 1508, RTI_data can be provided an internal unidirectional path, in parallel with the MIN interconnections, to selected nodes effectively bypassing the MIN. Thus, RTI_Valid may select the internal route within ACE device 1508.

Although the invention has been described with respect to specific embodiments thereof, these embodiments are merely illustrative, and not restrictive of the invention. For example, each ACE device on a ring may include a k-node or only one of the ACE devices on the ring may include a k-node in addition to other processing nodes. The interconnection scheme may include serial connection or parallel bus between devices. Further, the system bus may interconnect a plurality of rings, each comprising a plurality of ACE devices, to a host processor, memory or to other external devices.

A "processor" or "process" includes any human, hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems.

Any suitable programming language can be used to implement the routines of the present invention including C, C++, Java, assembly language, etc. Different programming techniques can be employed such as procedural or object oriented. The routines can execute on a single processing device or multiple processors. Although the steps, operations or computations may be presented in a specific order, this order may be changed in different embodiments. In some embodiments, multiple steps shown as sequential in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing.

In the description herein, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

A "memory" for purposes of embodiments of the present invention may be any medium that can contain, store, communicate, propagate, or transport the program for use by or in connection with the instruction execution system, apparatus, system or device. The memory can be, by way of example only but not by limitation, an electronic, magnetic, optical, electromagnetic, infrared, or semiconductor system, apparatus, system, device, propagation medium, or computer memory.

Reference throughout this specification to "one embodiment," "an embodiment," or "a specific embodiment" means that a particular feature, structure, or characteristic described in connection with the embodiment is included in at least one embodiment of the present invention and not necessarily in all embodiments. Thus, respective appearances of the phrases "in one embodiment," "in an embodiment," or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Embodiments of the invention may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of the present invention can be achieved by any means as is known in the art. Distributed, or networked systems, components and circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope of the present invention to implement a program or code that can be stored in a machine-readable medium to permit a computer to perform any of the methods described above.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a," "an," and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

What is claimed is:

1. A digital processing system comprising:
   a first semiconductor device having a plurality of computation nodes;

a second semiconductor device having a microprocessor-based node adapted to function as a system controller and a plurality of computation nodes; and a bus for inter-connecting said first semiconductor device to said second semiconductor device in a ring topology whereby the microprocessor-based node allocates a plurality of operations among said computation nodes of said first and second semiconductor devices over said inter-connecting bus and receives the results of said operations over said inter-connecting bus.

2. The digital processing system of claim 1 wherein said computation nodes on said first and second semiconductor devices include at least one of the following node types: an arithmetic node, a bit manipulation node, a reduced instruction set processing node and a finite state machine node.

3. The digital processing system of claim 1 wherein the digital system includes a plurality of nodes each of which can perform at least one type of operation and wherein said microprocessor node allocates functions temporally and spatially among the nodes of said first and second semiconductor devices.

4. The digital processing system of claim 1 further comprising:

a remote processor; and a second bus for interfacing said first and second semiconductor device to said remote processor.

5. The digital processing system of claim 4 further comprising:

a real-time data source; and a third bus for interfacing said first and second semiconductor device to said real-time data generator.

6. The inter-connecting bus of the digital processing system of claim 1 further comprising:

a plurality of logic elements, each closely proximate to a corresponding output pad of said first semiconductor device, for sending data and control signals;

a plurality of logic elements, each closely proximate to a corresponding input pad of said second semiconductor device, for receiving said data and control signals;

and means for synchronously transferring data and control logic by clocking the logic elements of said first and second semiconductor devices.

7. The digital processing system of claim 6 further comprising:

a first core logic clock signal provided to each of said nodes of said first semiconductor device;

a second core logic clock signal provided to each of said nodes of said second semiconductor device, said first and second core logic clocks having substantially the same frequency and phase;

a first bus clock for clocking said logic elements of said first semiconductor device at a selected rate where said first bus clock is derived from said first core logic clock;

a second bus clock for clocking said logic elements of said second semiconductor device at said selected rate where said second bus clock is derived from said second core logic clock; and a synchronizing signal generated by said first semiconductor device.

8. The digital processing system of claim 1 further comprising:

a first core logic clock signal provided to each of said nodes of said first semiconductor device;

a second core logic clock signal provided to each of said nodes of said second semiconductor device, said first and second core logic clocks having substantially the same frequency and phase; and means for synchronizing the transfer for data and control signals from said first semiconductor device to said second semiconductor device, said synchronizing means derived from said first core logic clock signal.

9. The synchronizing means of claim 8 further comprising:

a first bus clock for clocking said logic elements of said first semiconductor device at a selected rate where said first bus clock is derived from said first core logic clock;

a second bus clock for clocking said logic elements of said second semiconductor device at said selected rate where said second bus clock is derived from said second core logic clock; and a signal, generated by said first semiconductor device, for indicating valid data and control signals to said second semiconductor device.

10. The digital processing system of claim 1 wherein said first and second semiconductor devices are coupled in a ring with said inter-connecting bus coupling an output port of said first semiconductor device to an input port of said second semiconductor device and further coupling an output port of said second semiconductor device to an input port of said first semiconductor device.

11. The digital processing system of claim 1 wherein said microprocessor-based node determines whether a packet received on said second bus is addressed to a node on either said first or second semiconductor device.

12. The digital processing system of claim 11 wherein said microprocessor-based node passes said packet to one of said plurality of computation nodes on said first semiconductor device if said packet is addressed to a node on said first semiconductor device or transferring said packet to one of said plurality of computation nodes on said second semiconductor device if said packet is addressed to a node on said second semiconductor device where said packet is transferred on said inter-connecting bus.

13. The digital processing system of claim 11 wherein said packet includes a device identification field.

14. A digital processing system comprising:

a plurality of adaptive computing engines each having a plurality of computation nodes;

said adaptive computing engines coupled to each other by in a ring topology bus that couples a first adaptive computing engine to a second adaptive computing engine, couples said second adaptive computing engine to a third adaptive computing engine and couples said third adaptive computing engine to said first adaptive computing engine, said bus adapted for passing packets between said computation nodes by passing them around said ring topology bus;

one of said adaptive computing engines having a kernel node, said kernel node adapted for determining whether a packet is addressed for one of said computation nodes in one of said adaptive computing engines and for discarding packets addressed to computational nodes that are not part of said digital processing system.

15. The digital processing system of claim 14, wherein each of said adaptive computing engines includes a device identification number and said packet includes a device identification field.

16. The digital processing system of claim 15, wherein each adaptive computing engine includes an output port coupled to an input port of the next adjacent adaptive computing engine in said ring topology bus.

17. The digital processing system of claim 16, wherein said ring topology bus comprises more than two, adaptive computing engines.

18. The digital processing system of claim 16 wherein at least one of said output ports comprises a plurality of D type flip flops coupled to a corresponding plurality of D type flip flops at said input port.

19. A method for transferring information from one adaptive computing engine having a plurality of computational nodes to another adaptive computing engine having a second plurality of computational nodes, each adaptive computing engine having an input port and an output port, said adaptive computing engines being coupled to each other through a ring topology bus, said method comprising the steps of:

generating a common clock signal routed to at least two adaptive computing engines;

requesting to transfer information from a first adaptive computing engine to a second adaptive computing engine via said ring topology bus;

offering to receive said information;

transferring said information from a D type flip flop associated with an output port of a first adaptive computing engine to a D type flip flop associated with an input port of a second adaptive computing engine via said ring topology bus;

controlling the transfer of said information from said D type flip flop associated with said output port of said first adaptive computing engine with a first clock derived from said common clock signal;

controlling the receipt of said information by said D type flip flop associated with said input port of said second adaptive computing engine with a second clock derived from said common clock signal; and generating a signal to define a time period during which the transfer of said information is valid.

20. The method of claim 19 further comprising the step of coupling up to four adaptive computing engines in said ring topology bus.

21. The method of claim 20 further comprising the steps of:

designating one of said adaptive computing engines in said ring topology bus to function as a kernel node;

initially receiving said information at said designated adaptive computing engine; and determining whether said information is intended for one of the adaptive computing engines in said ring topology bus.

22. The method of claim 21 further comprising the step of transferring said information from adaptive computing engine to adaptive computing engine around said ring topology bus until said information arrives at the intended adaptive computing engine.

23. The method of claim 22 further comprising the step of discarding said information if said kernel node determines the information is not intended for one of the adaptive computing engines in said ring topology bus.

24. The method of claim 23 further comprising the step of passing said information from adaptive computing engine to adaptive computing engine around said ring topology bus until said information arrives at its intended destination adaptive computing engine.

25. The method of claim 21 further comprising the step of providing a FIFO buffer, coupled to said D type flip flop associated with said output port, for retaining information until the input port offers to receive information.

26. The method of claim 25 further comprising the step of providing a FIFO buffer, coupled to said D type flip flop associated with said input port of said second adaptive computing engine said FIFO buffer receiving information after closing said window that indicates the transfer of said information is valid.

27. A digital device comprising:

a processor;

a user interface controlled by said processor; memory associated with said processor; and a plurality of adaptive computing engine devices each having a plurality of computation nodes;

said adaptive computing engine devices coupled in a ring topology by a first bus that extends between first and second adaptive computing engine devices that are adjacent to each other in said ring topology;

at least one of said adaptive computing devices coupled to said processor and said memory by a second bus so that each of said plurality of computation nodes can access said memory.

28. The digital device of claim 27, further comprising: a real-time data source; and a third bus coupling said real-time data source to at least one of said plurality of adaptive computing engine devices.

29. The digital device of claim 27, wherein each of said plurality of adaptive computing engine devices is coupled to said second bus.

30. The digital device of claim 27, wherein said first bus couples an output port of each device to an input port of a next device in said ring.

31. The digital device of claim 27, wherein said first bus includes:

a plurality of D type flip flops, each closely proximate to a corresponding output pad of output port, for sending data and control signals;

a plurality of D type flip flops, each closely proximate to a corresponding input pad of said output port, for receiving said data and control signals; and means for synchronously transferring data and control logic by clocking the logic elements of said first and second semiconductor devices.

32. The digital device of claim 27, wherein one of said plurality of adaptive computing engine devices includes a kernel node.

33. An integrated circuit comprising:

a plurality of computational elements including a plurality of arithmetic nodes, a plurality of bit-manipulation nodes, a plurality of finite state machine nodes, and a plurality of input/output nodes;

a first and a second processing node each having a corresponding core processor based on a common architecture;

a first memory associated with said first processing node;

a second memory associated with said second processing node;

a first node wrapper for coupling a first core processor of said first processing node to said first memory and to said computational elements;

a second node wrapper for coupling a second core processor of said second processing node to said second memory and to said computational elements; and means for interconnecting said computational elements and said first and second processing nodes in a ring topology bus, to define a selected task to achieve a desired functionality.

34. The integrated circuit of claim 33 further comprising means for temporally adapting said second node and said computational elements to perform a selected function.

35. The integrated circuit of claim 34 wherein said temporal means further comprises executable code defining said selected function stored in at least said first memory.

36. The integrated circuit of claim 35 wherein said executable code is downloaded from the Internet by said first processing node.

37. The integrated circuit of claim 36 wherein said executable code comprises operating system code.

38. The integrated circuit of claim 37 wherein said first processing node initiates the temporal adaptation of said computational elements and said second processing node to perform said selected function.

39. The integrated circuit of claim 33 wherein said computational elements include a plurality of arithmetic nodes, a plurality of bit-manipulation nodes and a plurality of finite state machine nodes.

40. The integrated circuit of claim 33 further comprises a plurality of said second processing nodes each of which is coupled to said first processing node and computational elements by said interconnecting means.

41. An adaptive computing engine comprising:
a controller node having: a core processor for executing operating system code;
a memory for storing operating system executable code;
means for transferring operating system executable code and data from said memory to said core processor;
a plurality of computational elements coupled to each other through a ring topology bus and each of them adapted to perform a selected function, at least one of said computational elements having: a RISC processor for executing code; a memory for storing executable code; means for transferring executable code and data from said memory to said RISC processor; and
a temporal interconnecting matrix coupling said controller node to said plurality of computational elements to perform a user selected function.

42. An adaptive computing engine having a plurality of computational elements and a temporal interconnecting matrix for connecting said computational elements, said adaptive computing engine comprising: a controller node for adapting said computational elements in response to perform a selected function, said controller node having: a core processor for executing operating system code;
a memory for storing operating system executable code;
means for transferring operating system executable code and data from said memory to said core processor;
a set of registers associated with said core processor; a node wrapper, coupled to said core processor, for receiving an input stream from an external source, said input stream having configuration information and executable code and passing said information to said core processor;
means for accessing said set of registers; an interrupt controller for detecting interrupt conditions from said node wrapper and internally; and
an input port and an output port, said input and output ports for coupling said adaptive computing engine into a ring topology network.

43. The adaptive computing engine of claim 42 further comprising means for accessing said core processor and said memory to debug error conditions.

44. The adaptive computing engine of claim 42 further comprising means for handling node-to-node communication.

45. The adaptive computing engine of claim 42 further comprising executable code for controlling the temporal adaptation of said computation elements in response to configuration information.

46. The adaptive computing engine of claim 45 further comprising means for controlling the initiation of operation of said computational element upon reset or power on.

47. The adaptive computing engine of claim 46 further comprising a programmable scalar node having: a core processor for executing instructions;
an instruction memory for storing said instructions;
a data memory;
means for transferring instructions from instructions memory to said core processor and for transferring data to said core processor from said data memory;
a set of registers associated with said core processor; and
a node wrapper, coupled to said core processor, for receiving an input stream from controller node, said input stream having configuration information;
means for accessing said set of registers; and
an interrupt controller for detecting interrupt conditions.

48. The adaptive computing engine of claim 47 further comprising: a data cache; and an instruction cache.

* * * * *